(12) United States Patent
Brezzo et al.

(10) Patent No.: US 8,856,055 B2
(45) Date of Patent: Oct. 7, 2014

(54) RECONFIGURABLE AND CUSTOMIZABLE GENERAL-PURPOSE CIRCUITS FOR NEURAL NETWORKS

(75) Inventors: Bernard V. Brezzo, Somers, NY (US); Leland Chang, New York, NY (US); Steven K. Esser, San Jose, CA (US); Daniel J. Friedman, Sleepy Hollow, NY (US); Yong Liu, Rye, NY (US); Dharmendra S. Modha, San Jose, CA (US); Robert K. Montoye, Rochester, MN (US); Bipin Rajendran, White Plains, NY (US); Jae-sun Seo, White Plains, NY (US); Jose A. Tierno, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 13/083,414

(22) Filed: Apr. 8, 2011

(65) Prior Publication Data
US 2012/0259804 A1     Oct. 11, 2012

(51) Int. Cl.
*G06N 3/063*     (2006.01)
*G06N 3/04*     (2006.01)

(52) U.S. Cl.
CPC ............. *G06N 3/063* (2013.01); *G06N 3/049* (2013.01)
USPC .......................................................... 706/33

(58) Field of Classification Search
CPC ........................................................ G06N 3/063
USPC .................................................................. 706/33
See application file for complete search history.

(56) References Cited

U.S. PATENT DOCUMENTS

| | | | |
|---|---|---|---|
| 5,119,469 A | 6/1992 | Alkon et al. | |
| 5,479,579 A | 12/1995 | Duong et al. | |
| 5,602,965 A | 2/1997 | Fu | |
| 5,717,832 A | 2/1998 | Steimle et al. | |
| 5,822,742 A | 10/1998 | Alkon et al. | |
| 6,389,404 B1 | 5/2002 | Carson et al. | |
| 7,398,259 B2 | 7/2008 | Nugent | |
| 7,426,501 B2 | 9/2008 | Nugent | |
| 7,502,769 B2 | 3/2009 | Nugent | |
| 7,599,895 B2 | 10/2009 | Nugent | |
| 2004/0158543 A1 | 8/2004 | Salam et al. | |
| 2009/0187736 A1 | 7/2009 | Raichelgauz et al. | |
| 2010/0076915 A1 | 3/2010 | Xu et al. | |

OTHER PUBLICATIONS

Schemmel et al ("A New VLSI Model of Neural Microcircuits Including Spike Time Dependent Plasticity" 2004.*

(Continued)

*Primary Examiner* — Lut Wong
(74) *Attorney, Agent, or Firm* — Kenneth L. Sherman, Esq.; Michael Zarrabian, Esq.; Sherman & Zarrabian LLP

(57) ABSTRACT

A reconfigurable neural network circuit is provided. The reconfigurable neural network circuit comprises an electronic synapse array including multiple synapses interconnecting a plurality of digital electronic neurons. Each neuron comprises an integrator that integrates input spikes and generates a signal when the integrated inputs exceed a threshold. The circuit further comprises a control module for reconfiguring the synapse array. The control module comprises a global final state machine that controls timing for operation of the circuit, and a priority encoder that allows spiking neurons to sequentially access the synapse array.

27 Claims, 19 Drawing Sheets

(56) References Cited

OTHER PUBLICATIONS

Seo et al ("A 45nm CMOS Neuromorphic Chip with a Scalable Architecture for Learning in Networks of Spiking Neurons" Sep. 2011).*

Schemmel et al ("Wafer-Scale Integration of Analog Neural Networks" 2008).*

Arthur et al ("Learning in Silicon: Timing is Everything" 2006).*

Glackin, B. et al., A Hardware Accelerated Simulation Environment for Spiking Neural Networks, Proceedings of the 5th International Workshop on Reconfigurable Computing: Architectures, Tools, and Applications, Lecture Notes in Computer Science, Springer-Verlag Berlin, vol. 5453, 2009, pp. 336-341, Heidelberg, Germany.

Liao, Y., Neural Networks in Hardware: A Survey, Department of Computer Science, University of California, downloaded from http://apt.cs.man.ac.uk/intranet/csonly/nn/NNHSurvey.pdf, 2001, p. 1-18, USA.

Budzisz, J.M., Ubichip Virtual Machine and Visualization of Spiking Neural Network Parameters, Master Thesis from the Technical University of Catalonia, Jan. 26, 2010, pp. i-79, Technical University of Catalonia, Catalonia, Spain.

Gao, C. et al., CMOS/CMOL Architectures for Spiking Cortical Column, Proceedings of IEEE International Joint Conference on Neural Networks (IJCNN), IEEE, Jun. 1-8, 2008, pp. 2442-2449, USA.

Jo, S.H., Nanoscale Memristive Devices for Memory and Logic Applications, Doctor of Philosophy Dissertation from the University of Michigan, 2010, pp. i-143, USA.

Vogelstein, R.J. et al., "Dynamically Reconfigurable Silicon Array of Spiking Neurons with Conductance-Based Synapses", Proceedings of the 2007 IEEE transactions on Neural Networks, Jan. 2007, pp. 253-265, vol. 18, Issue 1, IEEE Transactions, United States.

U.S. Non-Final Office Action for U.S. Appl. No. 13/587,594 mailed Apr. 10, 2014.

U.S. Notice of Allowance for U.S. Appl. No. 13/587,594 mailed Jul. 9, 2014, 2014.

* cited by examiner

190

```
┌─────────────────────────────────┐
│ Determine which neurons spiked  │
│ in a previous timestep, and     │──191
│ reset the potential of those    │
│ neurons                         │
└─────────────────────────────────┘
              ↓
┌─────────────────────────────────┐
│ Perform neuron spiking by       │
│ pulsing a row (or axon) of the  │
│ synapse array, read value of    │
│ each synapse in the row and     │──192
│ pass it to a connected neuron,  │
│ and obtain external input for   │
│ each neuron                     │
└─────────────────────────────────┘
              ↓
┌─────────────────────────────────┐
│ Each neuron checks a column (or │
│ dendrite) of the synapse array  │
│ for synapses in their "pulsed"  │
│ state and reads their values,   │──193
│ and integrates the synapse      │
│ (excitatory / inhibitory)       │
│ inputs as external input to the │
│ neuron potential                │
└─────────────────────────────────┘
              ↓
┌─────────────────────────────────┐
│ Depending on the time elapsed   │
│ since each neuron spiked,       │
│ probabilistically change a      │──194
│ connected synapse value, and    │
│ write the new synapse value     │
│ into the synapse array          │
└─────────────────────────────────┘
              ↓
┌─────────────────────────────────┐
│ Determine which neurons will    │
│ spike the next timestep by      │──195
│ comparing each neuron potential │
│ against a threshold             │
└─────────────────────────────────┘
```

FIG. 2B

RECONFIGURABLE AND CUSTOMIZABLE GENERAL-PURPOSE CIRCUITS FOR NEURAL NETWORKS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic systems, and in particular, reconfigurable and customizable general-purpose circuits for neural networks.

Neuromorphic and synaptronic systems, also referred to as artificial neural networks, are computational systems that permit electronic systems to essentially function in a manner analogous to that of biological brains. Neuromorphic and synaptronic systems do not generally utilize the traditional digital model of manipulating 0s and 1s. Instead, neuromorphic and synaptronic systems create connections between processing elements that are roughly functionally equivalent to neurons of a biological brain. Neuromorphic and synaptronic systems may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention describe a reconfigurable neural network circuit. In one embodiment, the reconfigurable neural network circuit comprises an electronic synapse array including multiple synapses interconnecting a plurality of digital electronic neurons. Each neuron comprises an integrator that integrates input spikes and generates a signal when the integrated inputs exceed a threshold. The circuit further comprises a control module for reconfiguring the synapse array. The control module comprises a global final state machine that controls timing for operation of the circuit, and a priority encoder that allows spiking neurons to sequentially access the synapse array.

These and other features, aspects and advantages of the present invention will become understood with reference to the following description, appended claims and accompanying figures.

BRIEF DESCRIPTION OF THE SEVERAL VIEWS OF THE DRAWINGS

FIG. 2B shows a process for updating/programming synapses in the circuit of FIG. 2A, in accordance with an embodiment of the invention;

DETAILED DESCRIPTION

Embodiments of the invention provide reconfigurable and customizable general-purpose circuits for neural networks. Embodiments of the invention further provide neuromorphic and synaptronic systems based on the reconfigurable and customizable general-purpose circuits, including crossbar arrays which implement learning rules for re-enforcement learning.

An embodiment of the reconfigurable and customizable general-purpose circuit provides a system-level computation/communication platform comprising a neural network hardware chip. The circuit provides a reconfigurable compact and low-power digital CMOS spiking network implementing binary stochastic STDP on a static random access memory (SRAM) synapse array interconnecting digital neurons. A priority encoder sequentially grants array access to all simultaneously spiking neurons to implement communication of synaptic weights for programming of synapses. A global finite state machine module controls timing for operation of the circuit. Driver module receives digital inputs from neurons for programming the synapse array using programming phases. Sense amplifiers measure the state of each synapse and convert it to binary data, representing data stored in the synapse.

Each digital neuron further comprises a learning module including two digital counters that decay at a pre-specified rate (e.g., about 50 ms) at each timestep and are reset to a pre-defined value when a neuron spiking event occurs. A linear feedback shift register (LFSR) generates a new random number (e.g., pseudo random number) during every programming phase. A comparator provides a digital signal that determines whether or not a connected synapse is updated (i.e., programmed). This implements probabilistic updates of synapses according to the learning rule specified in the decay rate of the counter.

Timing operations of the general-purpose hardware circuit for neural networks involves a timestep (e.g., based on a biological timestep) wherein within such a timestep multiple neuron spikes and synapse updates are sequentially handled in a read phase and a write phase, respectively, utilizing a digital clock. Further, variable timesteps may be utilized wherein the start of a next timestep may be triggered using handshaking signals whenever the neuron/synapse operation of the previous timestep is completed. For external communication, pipelining is utilized wherein load inputs, neuron/synapse operation, and send outputs are pipelined (this effectively hides the input/output operating latency).

Figure 1:
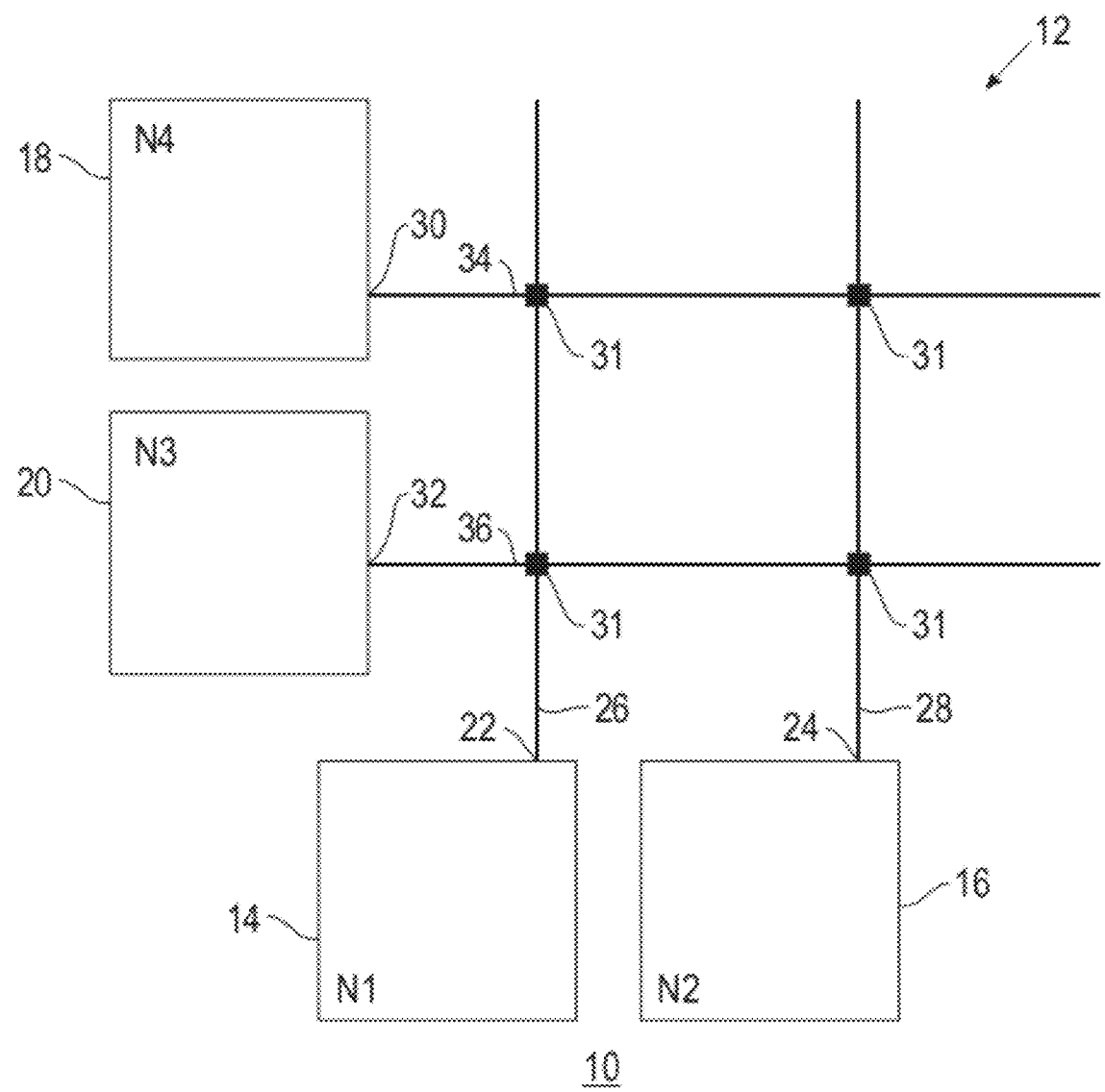
FIG. 1 shows a diagram of a neuromorphic and synaptronic network comprising a crossbar array of electronic synapses interconnecting electronic neurons, in accordance with an embodiment of the invention.

Referring now to FIG. 1, there is shown a diagram of a neuromorphic and synaptronic circuit 10 having a crossbar array 12 in accordance with an embodiment of the invention. In one example, the overall circuit may comprise an "ultra-dense crossbar array" that may have a pitch in the range of about 0.1 nm to 10 µm. The neuromorphic and synaptronic circuit 10 includes a crossbar array 12 interconnecting a plurality of digital neurons 14, 16, 18 and 20. These neurons are also referred to herein as "electronic neurons". Neurons 14 and 16 are dendritic neurons and neurons 18 and 20 are axonal neurons. Neurons 14 and 16 are shown with outputs 22 and 24 connected to dendrite paths/wires (dendrites) 26 and 28, respectively. Neurons 18 and 20 are shown with outputs 30 and 32 connected to axon paths/wires (axons) 34 and 36, respectively.

Neurons 18 and 20 also contain inputs and receive signals along dendrites, however, these inputs and dendrites are not shown for simplicity of illustration. Neurons 14 and 16 also contain inputs and receive signals along axons, however, these inputs and axons are not shown for simplicity of illustration. Thus, the neurons 18 and 20 will function as dendritic neurons when receiving inputs along their dendritic connections. Likewise, the neurons 14 and 16 will function as axonal neurons when sending signals out along their axonal connections. When any of the neurons 14, 16, 18 and 20 fire, they will send a pulse out to their axonal and to their dendritic connections.

Each connection between dendrites 26, 28 and axons 34, 36 are made through a digital synapse device 31 (synapse). The junctions where the synapse devices are located may be referred to herein as "cross-point junctions". In general, in accordance with an embodiment of the invention, neurons 14 and 16 will "fire" (transmit a pulse) when the inputs they receive from axonal input connections (not shown) exceed a threshold. Neurons 18 and 20 will "fire" (transmit a pulse) when the inputs they receive from dendritic input connections (not shown) exceed a threshold. In one embodiment, when neurons 14 and 16 fire they maintain an anti-STFP (A-STDP) variable that decays. For example, in one embodiment, the decay period may be 50 ms. The A-STDP variable is used to achieve STDP by encoding the time since the last firing of the associated neuron. Such STDP is used to control "potentiation", which in this context is defined as increasing synaptic conductance. When neurons 18, 20 fire they maintain a D-STDP variable that decays in a similar fashion as that of neurons 14 and 16.

A-STDP and D-STDP the variables may decay according to exponential, linear, polynomial, or quadratic functions, for example. In another embodiment of the invention, the variables may increase instead of decreasing over time. In any event, this variable may be used to achieve dendritic STDP, by encoding the time since the last firing of the associated neuron. Dendritic STDP is used to control "depression", which in this context is defined as decreasing synaptic conductance.

An external two-way communication environment may supply sensory inputs and consume motor outputs. Digital neurons implemented using complementary metal-oxide-semiconductor (CMOS) logic gates receive spike inputs and integrate them. The neurons include comparator circuits that generate spikes when the integrated input exceeds a threshold. In one embodiment, binary synapses are implemented using transposable 1-bit SRAM cells, wherein each neuron can be an excitatory or inhibitory neuron. Each learning rule on each neuron axon and dendrite are reconfigurable as described hereinbelow.

Figure 2A:
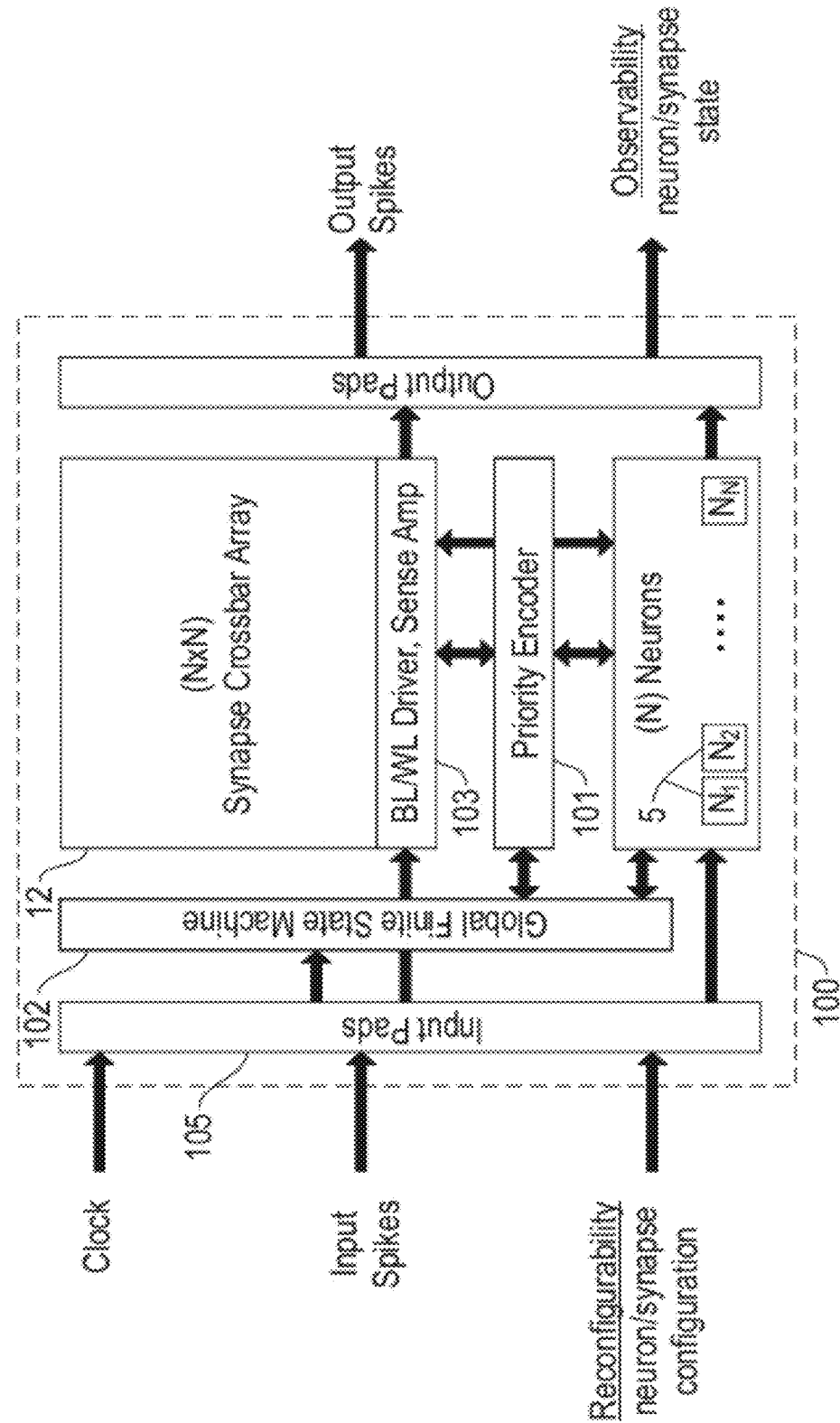
FIG. 2A shows a diagram of a neuromorphic and synaptronic circuit comprising a reconfigurable fully-connected neural network circuit with N neurons and N×N synapses, in accordance with an embodiment of the invention.

FIG. 2A shows a block diagram of a reconfigurable neural network circuit 100 implemented as a circuit chip according to an embodiment of the invention. The circuit 100 includes a synapse array, such as the crossbar array 12 in FIG. 1, interconnecting multiple digital neurons 5 (i.e., $N_1, \ldots, N_N$), such as neurons 14, 16, 18, 20 in FIG. 1. The fully connected synapse array 12 stores the strength of connection between each neuron 5 (e.g., integrate and fire electronic neuron). Each digital neuron 5 receives spike inputs from one or more other neurons and integrates them, such that when the integrated input exceeds a threshold, the digital neuron 5 spikes.

In one embodiment of the circuit 100, neuron operation and parameters (e.g., spiking, integration, learning, external communication) is reconfigurable, customizable, and observable. A priority encoder 101 controls access of simultaneously spiking neurons 5 to the crossbar array 12 in a sequential manner. Driver circuits 103 receive digital inputs from neurons 5 and programs the synapses 31 in the synapse array 12 using learning rules. Input pads 105 provide input interfaces to the circuit 100 and output pads provide output interfaces from the circuit 100. A global finite state machine 102 controls timing and operational phases for operation of the circuit 100. Each synapse interconnects an axon of a pre-synaptic neuron via a row of the array 12, with a dendrite of a post-synaptic neuron via a column of the array 12. Referring to the process 190 in FIG. 2B, according to an embodiment of the invention, within a timestep, the circuit 100 goes through the following sequence of phases for synapse updating (programming) based on signals from the global finite state machine:

Process block 191: Phase 1—Determine which neurons 5 spiked in a previous timestep, and reset the potential of those neurons.

Process block 192: Phase 2—Perform neuron spiking by pulsing a row (or axon) of the synapse array 12. Read value of each synapse 31 in the row and pass the value to a connected neuron 5. Obtain external input for each neuron.

Process block 193: Phase 3—Each neuron 5 checks a column (or dendrite) of the synapse array 12 for synapses 31 in their "pulsed" state and reads the synapse values, and integrates the synapse (excitatory/inhibitory) inputs as external input to the neuron potential.

Process block 194: Phase 4—Depending on the time elapsed since each neuron spiked (fired), probabilistically change a connected synapse value using a pseudo random number generator such as said LFSR. Write the new synapse value into the synapse array 12.

Process block 195: Phase 5—Determine which neurons will spike the next timestep by comparing each neuron potential against a customized threshold.

Figure 3:
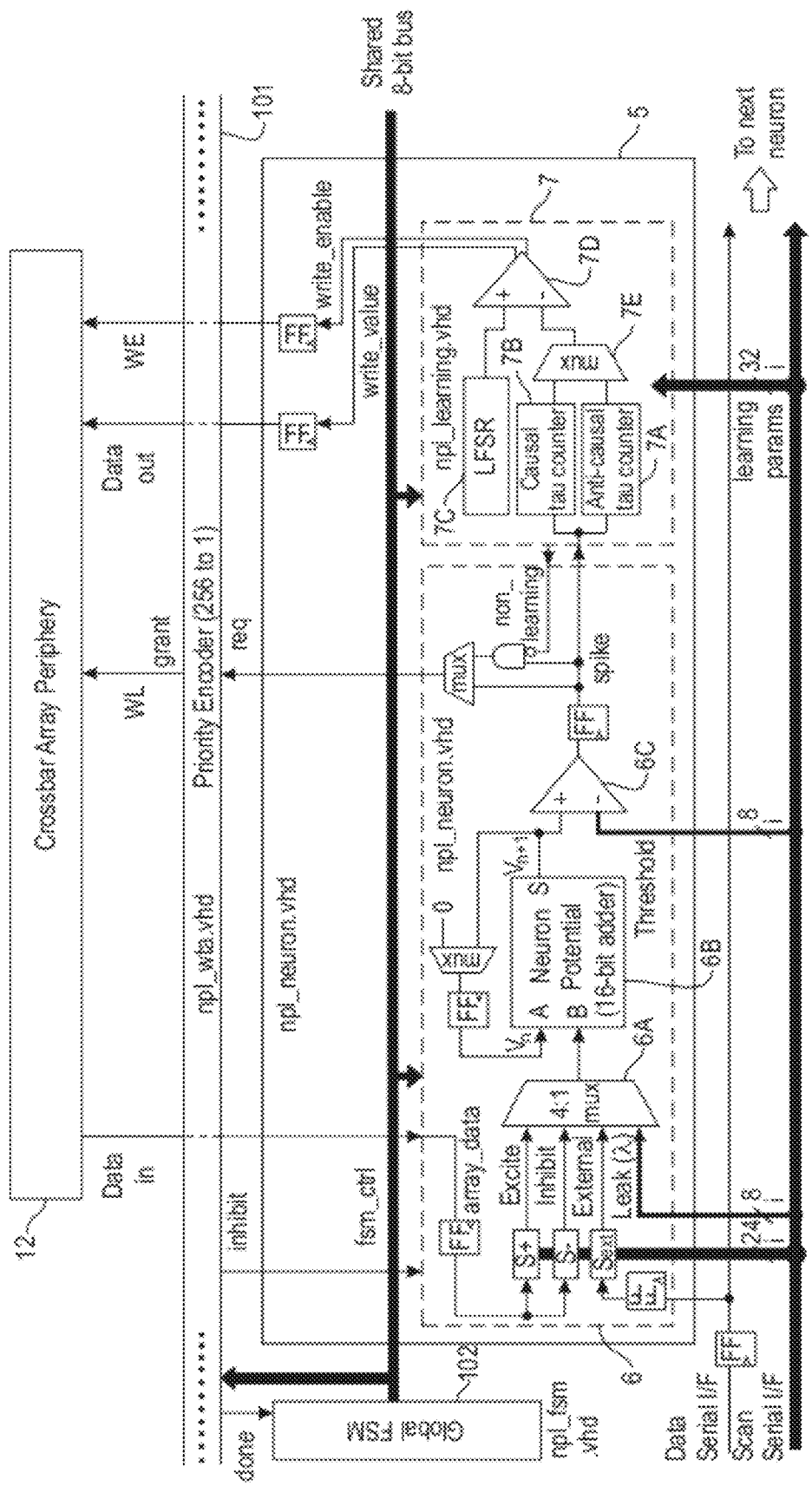
FIG. 3 shows a diagram of a digital electronic neuron in the circuit of FIG. 2A, in accordance with an embodiment of the invention.

FIG. 3 shows details of an example implementation of digital neuron 5, according to an embodiment of the invention. In one embodiment, the neuron 5 comprises a reconfigurable digital CMOS circuit device. Specifically, the neuron 5 comprises an integration and spike module 6 and a learning module 7. In the integration and spike module 6, a multiplexer circuit 6A is used to select all the inputs arriving at the neuron 5 to integrate to a value held at an adder circuit 6B. The value in the adder circuit 6B represents the potential of the neuron 5 (e.g., voltage potential V based on accumulated input spikes). A comparator circuit 6C is used to check if the current value in the adder 6B is above a threshold value. The output of the comparator 6C is used to signal neuron spiking. This spike signal is then sent to the priority encoder 101 which then grants the neuron 5 access to the crossbar synapse array 12 in a sequential manner.

The learning module 7 includes digital counters 7A and 7B, which decay at a pre-specified rate each time step and are reset to a pre-defined value when the neuron spikes. A LFSR 7C generates sequences that are maximally random. During every synapse programming phase, the LFSR 7C generates a new random number. A comparator circuit 7D compares the random number with a counter value (i.e., from counters 7A and 7B via a multiplexer 7E) to provide a digital signal that determines whether or not a synapse 31 is updated (i.e., programmed). As such, synapses 31 are updated probabilistically according to a learning rule specified in the decay rate of a counter (i.e., counters 7A and 7B). In one embodiment, the causal counter 7B is used for pre-synaptic updates, and the anti-causal counter 7A is used for post-synaptic update (pre-synaptic and post-synaptic updates may utilize different learning rules).

Table 1 below shows an example neuron specification in conjunction with the circuits in FIGS. 2A and 3, according to an embodiment of the invention.

TABLE 1

| Neuron specification | |
| --- | --- |
| Number of bits for neuron potential | 8 bits + 4 overflow + 4 underflow bits |
| Number of bits for LFSR counter | 10 least significant bits (LSBs) derived from a 15 bit LFSR |
| Number of bits for tau counter | 8 bits |
| Number of LFSRs per neuron | One (used twice to generate the random number for causal and anti-causal update) |
| Number of tau counters per neuron | Two (one for causal and one for anti-causal). All neuron configurations maybe customized as needed. One exemplary configuration is listed in entry below. |
| Configuration | 1 bit to turn on and off learning |
| | 1 bit to specify if neuron is inhibitory or excitatory (bit is stored in priority encoder) |

Table 2 below shows an example neuron configuration for control and observability in conjunction with the circuits in FIGS. 2A and 3, according to an embodiment of the invention. All scan configurations (for control and observability) could be customized as needed. In Table 2 "b" means bits.

TABLE 2

| Neuron reconfiguration/observation | | | |
| --- | --- | --- | --- |
| Reconfiguration Control (Scan In) | | Observation (Scan Out) | |
| 8 b: | Excitatory weight (s+) | 1 b: | Excite/Inhibit input (SA out) |
| 8 b: | Inhibitory weight (s−) | 16 b: | Neuron potential (Vn) |
| 8 b: | Leak parameter ($\lambda$) | 1 b: | Spike signal ($\theta$ compare out) |
| 8 b: | External input weight ($s_{ext}$) | 10 b: | LFSR output |
| 8 b: | Threshold | 8 b*2: | Tau counter output |
| 1 b: | Learning enable | 1 b: | STDP comparator output |
| 28 b: | Learning parameters—8 b*2, 3 b*2, 6 b | | |
| 4 b: | Represent 16 learning modes | | |
| Total: 73 b | | Total: 45 b | |

As noted, in one embodiment each synapse interconnects an axon of a pre-synaptic neuron with a dendrite of a post-synaptic neuron. As such, in one embodiment, the circuit 100 comprises a first learning module for an axonal, pre-synaptic, neuron, and a second learning module for a dendritic, post-synaptic neuron, such that each of the learning modules is reconfigurable independent of the other.

Figure 4:
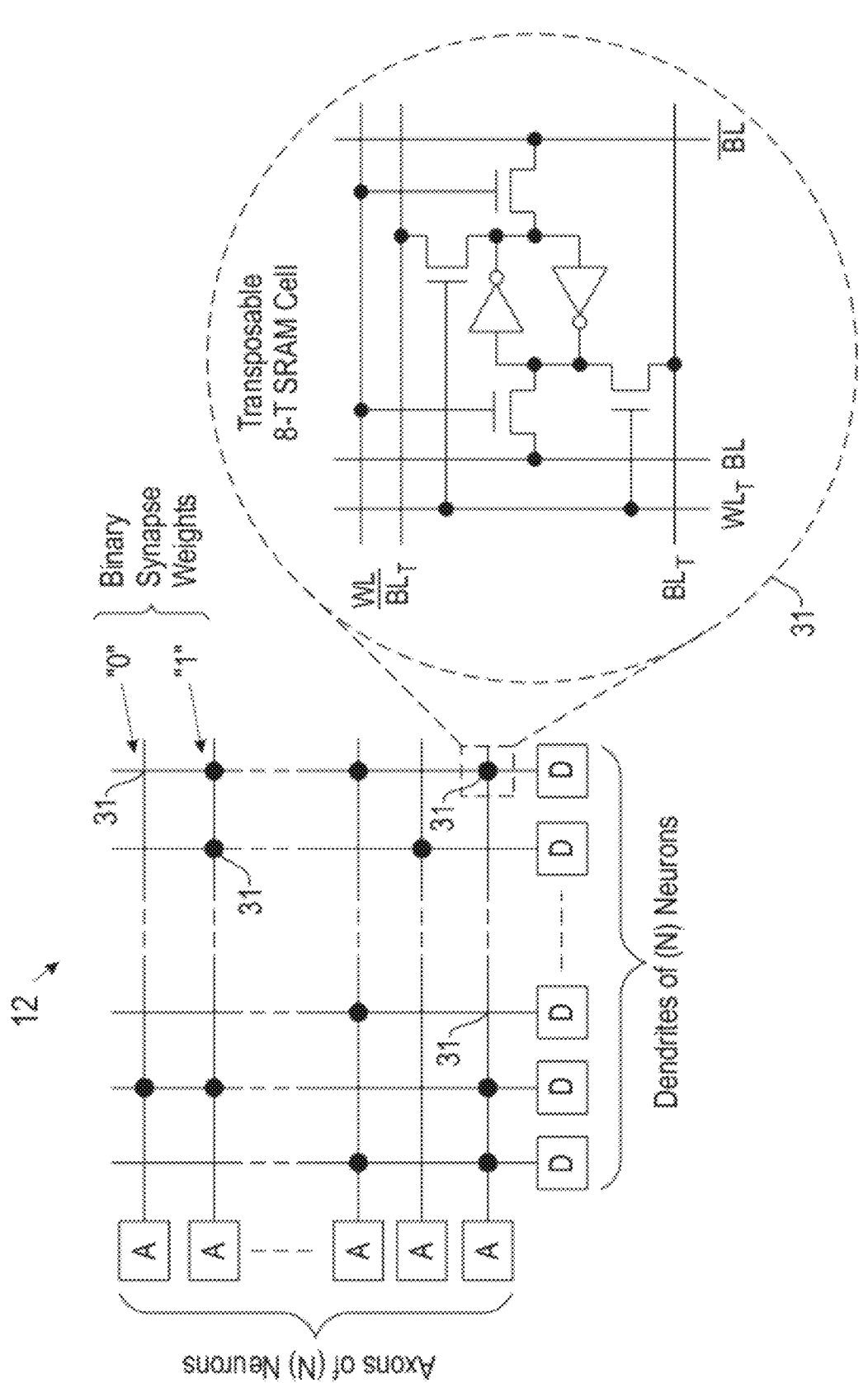
FIG. 4 shows a diagram of a crossbar array of electronic synapses and details of an electronic synapse at a cross-point junction of the crossbar array in the circuit of FIG. 2A, in accordance with an embodiment of the invention.

FIG. 4 shows an example implementation of the synapse crossbar array 12 of FIG. 2A, according to an embodiment of the invention. The synapses 31 are binary memory devices, wherein each synapse can have a weight "0" indicating it is non-conducting, or a weight "1" indicating it is conducting. In one embodiment, a synapse 31 comprises a transposable SRAM cell (e.g., transposable 8-T SRAM cell). The binary synapses 31 are updated probabilistically (e.g., using random number generators in neurons 5, as described further above). The crossbar array 12 can comprise a N×N transposable SRAM synapse array implementing a fully connected crossbar for N digital neurons 5 (e.g., N=16). A transposable cell 31 is utilized for pre-synaptic (row) and post-synaptic (column) synapse updates. WL stands for wordlines and BL stands for bitlines as for memory arrays. For transposability, WL, BL, $\overline{BL}$ (inversion of BL) are responsible for the row updates, and $WL_T$, $BL_T$, $\overline{BL}_T$ are responsible for the column updates.

Figure 5:
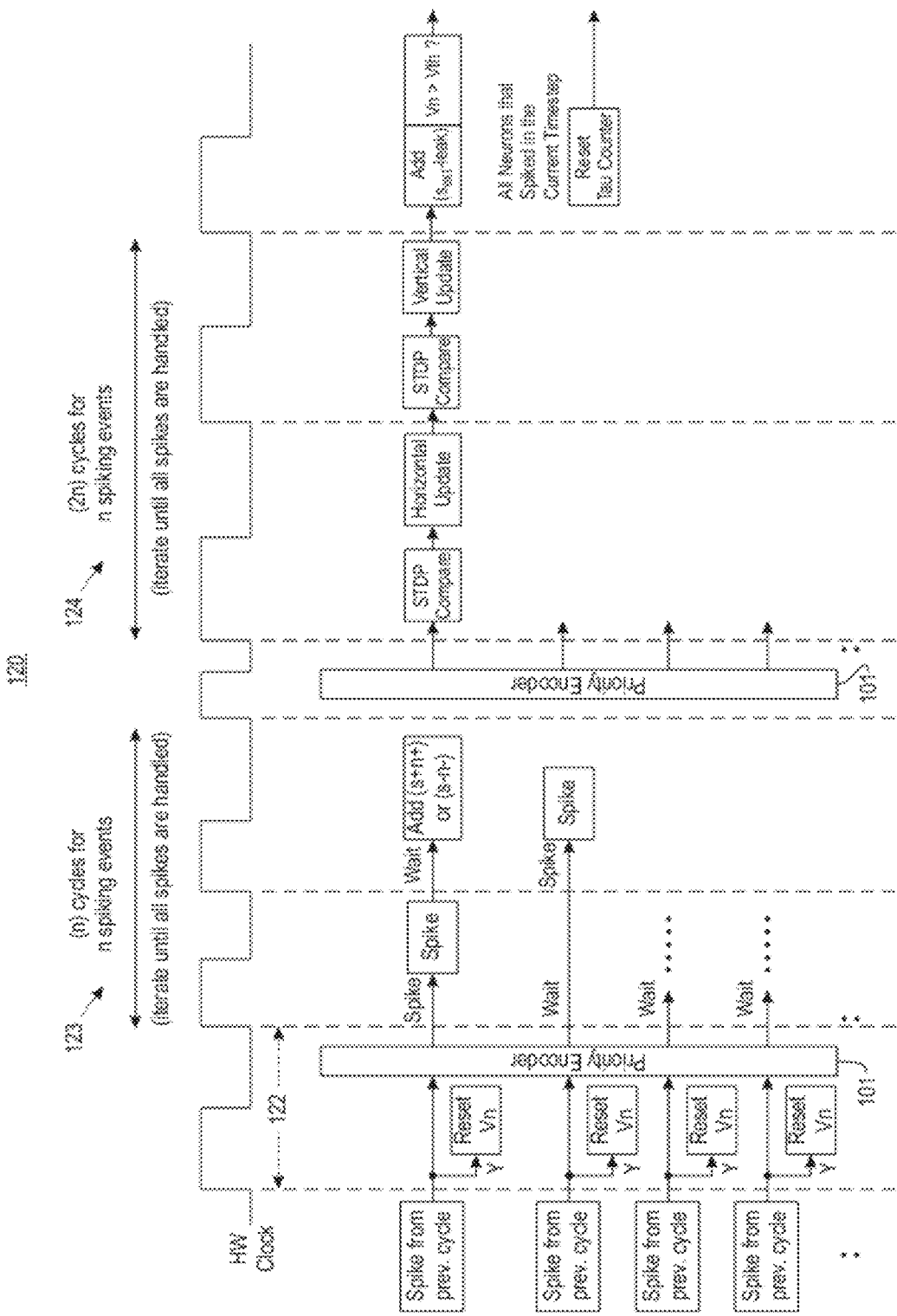
FIG. 5 shows a system timing diagram for neuron and synapse operations in the circuit of FIG. 2A, in accordance with an embodiment of the invention.

FIG. 5 shows an example system timing diagram 120 for neuron and synapse operation for the circuit 100 in conjunction with FIGS. 2A, 3 and 4, according to an embodiment of the global finite state machine 102. As illustrated in FIG. 5, sequential operation of neurons 5 is in a timestep implemented utilizing phases/cycles 122 of a digital clock (hardware (HW) clock), such as may be provided by the global finite state machine 102. All spiking neurons 5 first complete their communication in n cycles 123, and the updates for the synapses 31 on their axons and dendrites are completed in 2n cycles 124. A horizontal update (axonal synapse update in array 12) is for updating weights of synapses in a row of the crossbar array 12, and a vertical update (dendritic synapse update in array 12) is for updating weights of synapses in a column of the crossbar array 12.

Figure 6:
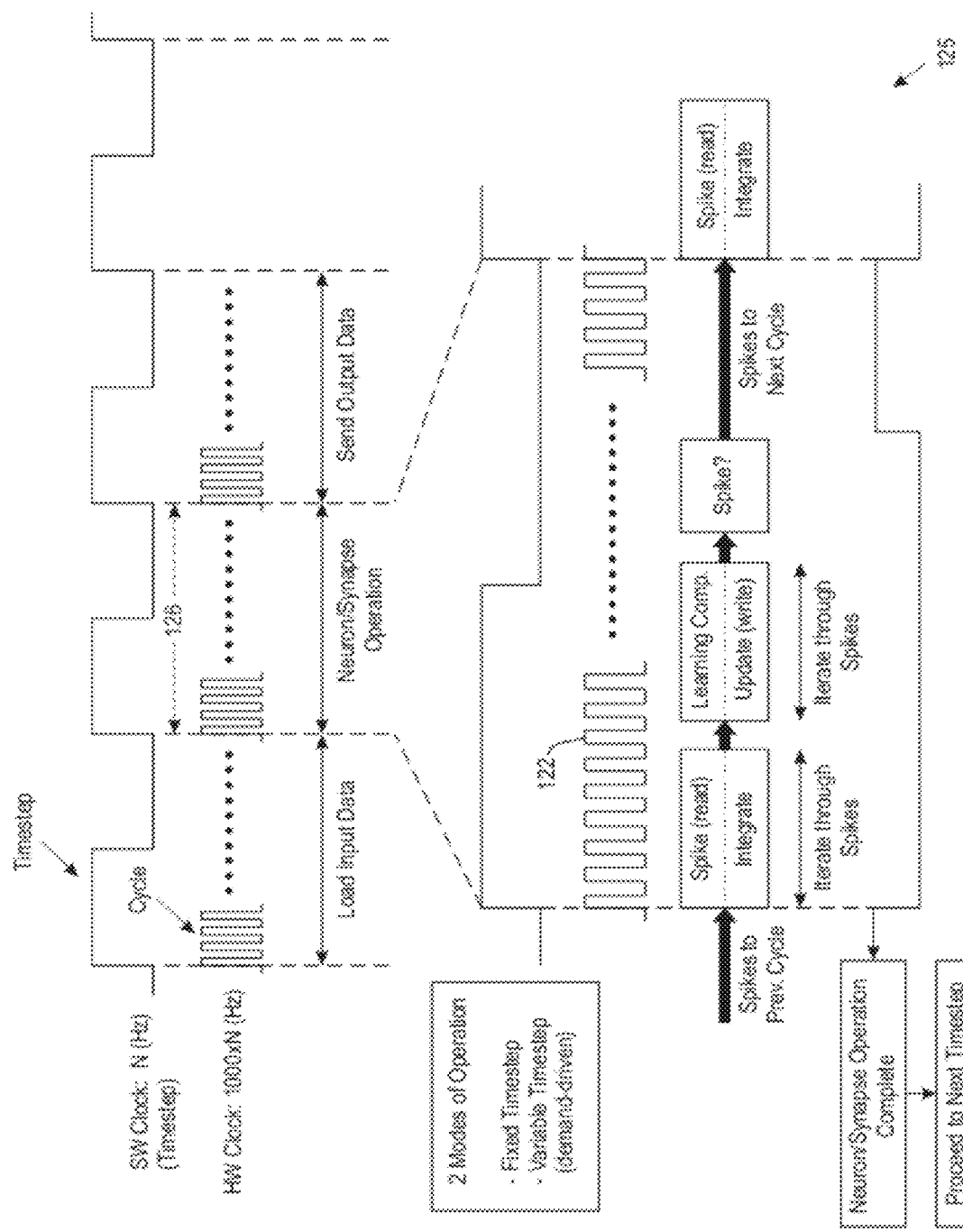
FIG. 6 shows another system timing diagram for neuron and synapse operations in the circuit of FIG. 2A, in accordance with an embodiment of the invention.

FIG. 6 shows another system timing diagram 125 for neuron and synapse operation for the circuit 100 in conjunction with FIGS. 2A, 3 and 4, for variable timesteps 126, according to an embodiment of the global finite state machine 102. The circuit 100 loads input data, performs neuron/synapse operations and sends out output date. For a variable timestep operation mode, when the circuit 100 has completed neuron and synapse operations before end of an allocated timestep, a neuron/synapse operation completion signal is generated to indicate that a next time step can begin without idling for current timestep to end. This provides overall faster learning time for the circuit 100. For a fixed timestep operation mode, the completion signal is not generated. Each software (SW) clock has a number of HW clocks.

SW clock corresponds to a biological timestep. Within one biological timestep, multiple operations are performed, including digital neuron potential integration, learning computation, synapse update, etc. Such operations may be performed in a sequential and pipelined manner, wherein each said timestep is divided into multiple (e.g., hundreds) of HW clock cycles, as shown by example in FIGS. 5-6. The HW clock cycles govern the digital neuron operations and synapse array updates as disclosed herein.

Figure 7:
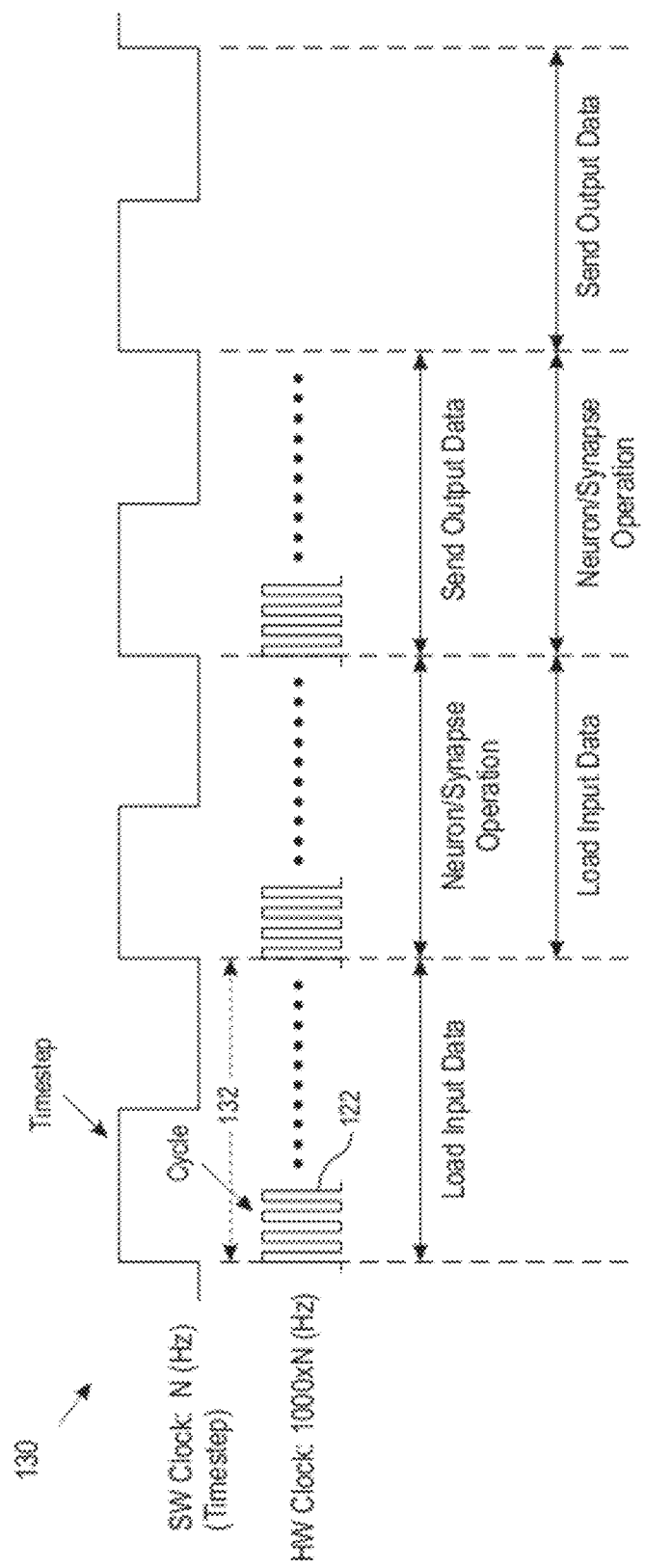
FIG. 7 shows a system timing diagram for pipelining neuron and synapse operations in the circuit of FIG. 2A, in accordance with an embodiment of the invention.

FIG. 7 shows a system timing diagram 130 for pipelining neuron and synapse operation for the circuit 100 in conjunctions with FIGS. 2A, 3 and 4, according to an embodiment of the global finite state machine 102. The pipelined operations of circuit 100 include three phases: load input, neuron/synapse operations (crossbar operation) and send output. In one example, a single clock of e.g. 1 MHz frequency is utilized for the HW clocking cycles 122, in each timestep 132, for data in/out latches, neuron latches, and other latches, and for clock gating each pipeline phase separately.

According to embodiments of the invention, the learning rules can be reconfigured depending on the algorithm or a certain application and are not limited to STDP learning rules. For example, anti-STDP, Hebbian, anti-Hebbian, and any other types of learning rules may be utilized.

Figure 8:
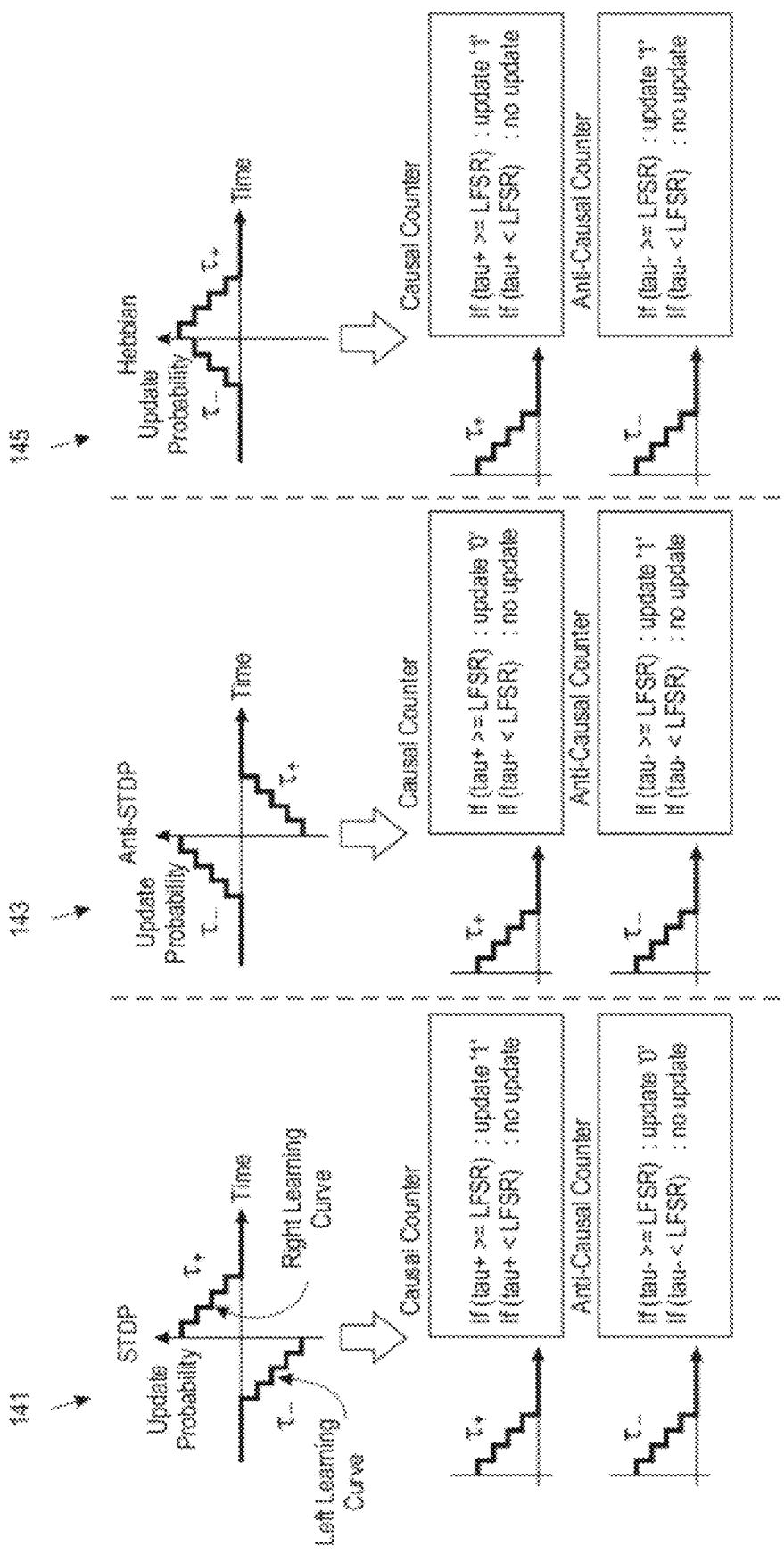
FIG. 8 shows learning mode processes based on learning rules for synapse updates in the circuit of FIG. 2A, in accordance with an embodiment of the invention.

FIG. 8 shows learning mode processes 141, 143, 145 for learning rules STDP, Anti-STDP (A-STDP) and Hebbian, respectively, in the circuit 100 without constant, according to an embodiment of the invention. The learning mode processes are performed in conjunction with neuron circuit 5 in FIG. 2A for probabilistic synapse updates. No synapse updates are performed for a non-learning mode. The τ (tau) counter value of a digital neuron 5 decreases as time elapses since the last spike. For a single-bit synapse update, when τ reaches 0, a constant (const) may be involved in the learning process. A synapse update may occur regardless of the value of τ.

Figure 9:
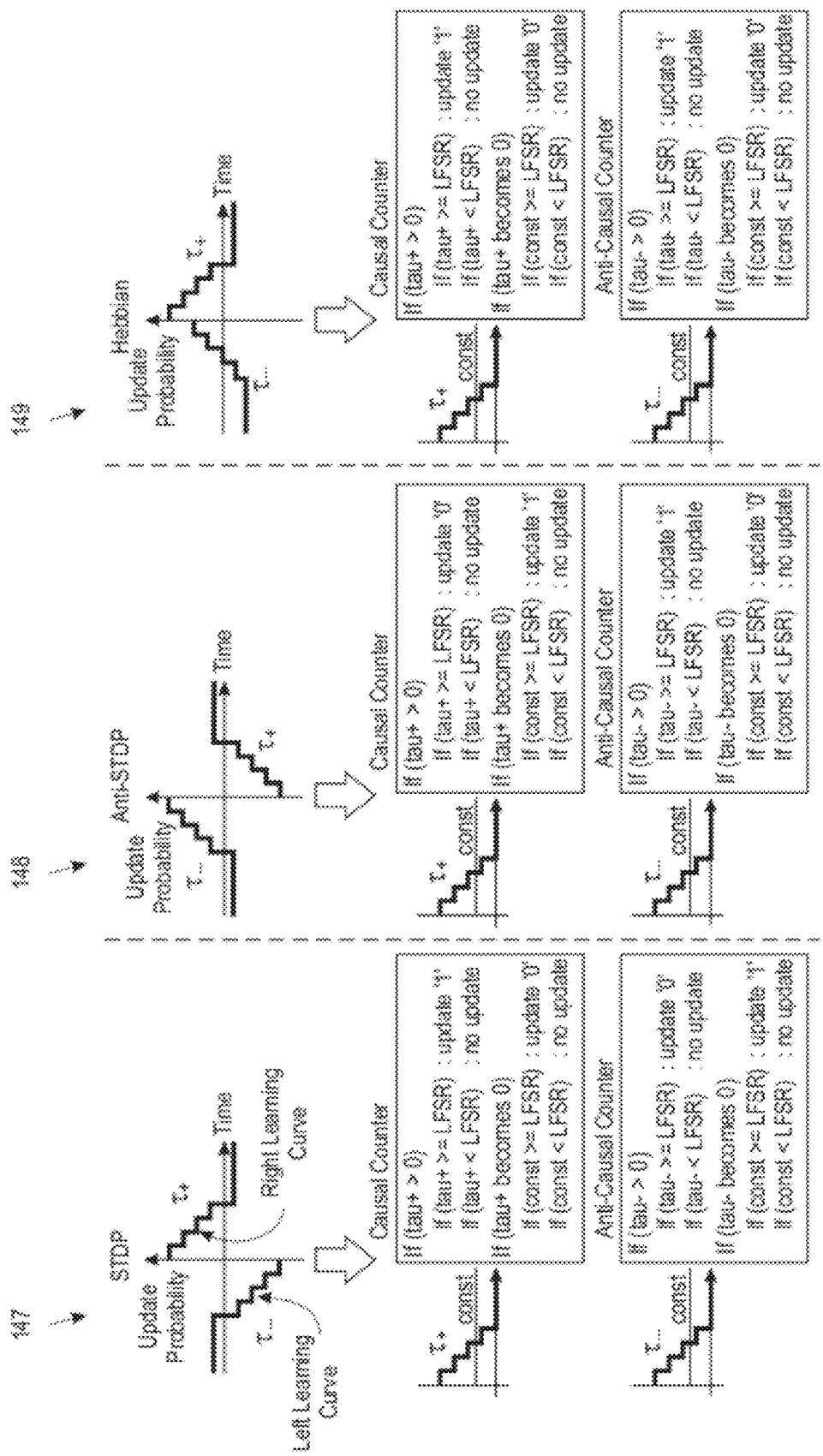
FIG. 9 shows further learning mode processes based on learning rules for synapse updates in the circuit of FIG. 2A, in accordance with an embodiment of the invention.

Referring to FIG. 9, when a constant is involved in the learning process, once τ reaches 0, the constant is compared with a random number from LFSR and update is performed with a certain probability. FIG. 9 shows learning mode processes 147, 148, 149 for learning rules STDP, Anti-STDP (A-STDP) and Hebbian, respectively, in the circuit 100 with constant, according to an embodiment of the invention. The learning mode processes are performed in conjunction with neuron circuit 5 in FIG. 2A for probabilistic synapse updates.

TABLE 3

| | Learning modes |
|---|---|
| Learning modes | STDP, anti-STDP, Hebbian, anti-Hebbian |
| Learning curve specification | 8 bits (for causal) + 8 bits (for anti-causal), for amplitude<br>3 bits (for causal) + 3 bits (for anti-causal), for decay rate<br>6 bits for constant level comparison (same for causal and anti-causal)<br>4 bits to specify learning mode |

Left and right learning curves of each learning mode in FIG. 9 can independently select whether a constant is used or not.

Figure 10:
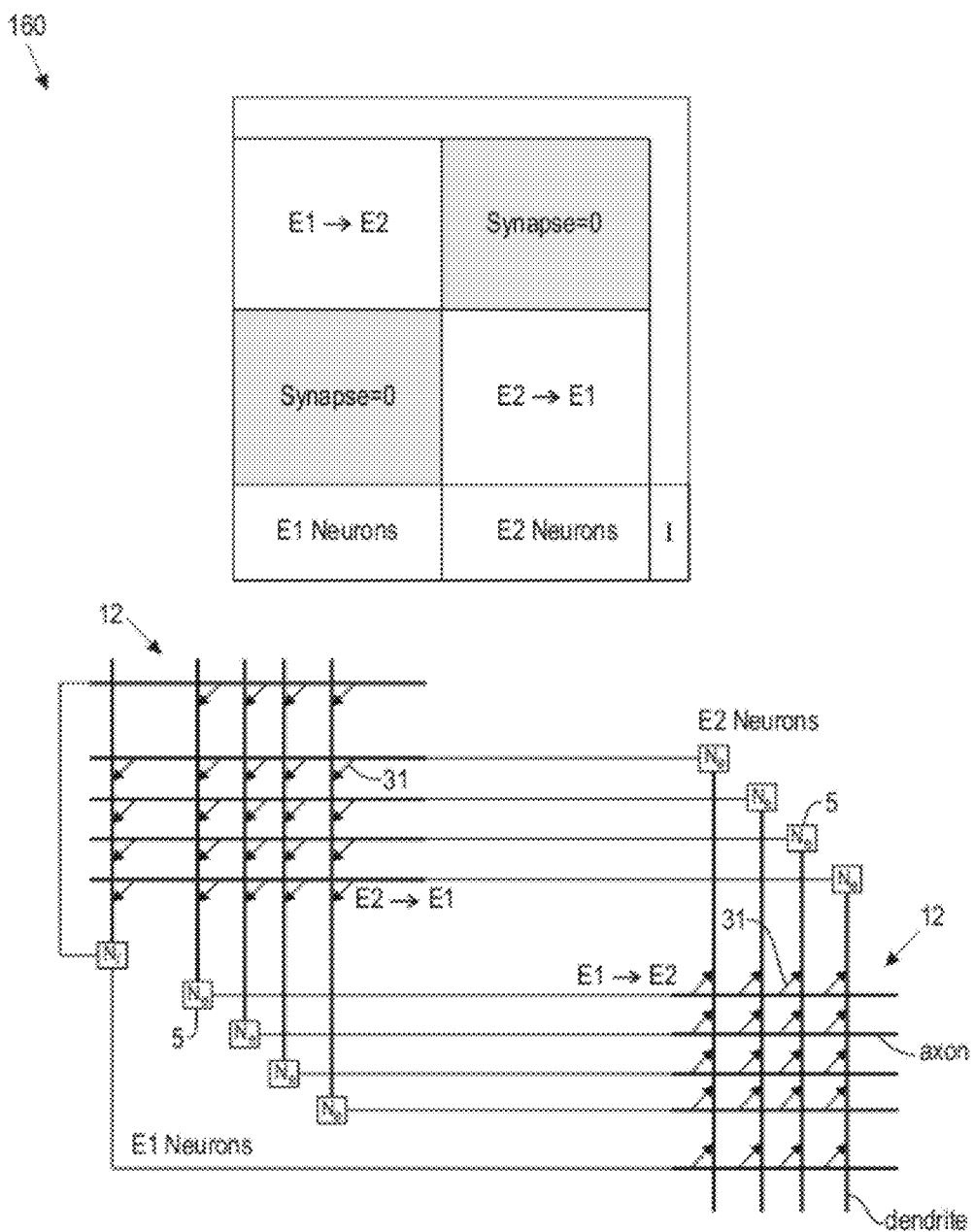
FIG. 10 shows an example neural network chip architecture based on the circuit of FIG. 2A, in accordance with an embodiment of the invention.

FIG. 10 shows an example chip architecture 160 based on the circuit 100, according to an embodiment of the invention. The synapse crossbar array comprises a N×N array of synapses 31 for N neurons 5, comprising two connected layers E1 and E2 of electronic neurons including excitatory neurons (Ne), and inhibitory neurons (Ni). The global finite state machine 102 includes a bit that sets the chip either in E1-E2 mode or fully connected array mode. During an initialization phase, the weight of synapses 31 in a diagonal block are set to 0 (as shown in top part of FIG. 11), and are never allowed to change. Each neuron 5 has 1 bit to specify if it is an E1 neuron or an E2 neuron. When a neuron spikes, a flag is set in the priority encoder 101 to indicate if the spiking neuron is an E1 neuron or an E2 neuron. This information is used by the other neurons for synapse update. During an update (learning) phase, a synapse 31 is updated only if it is at the intersection (cross-point junction in an array 12) of an E1 neuron and an E2 neuron. Table 4 below shows example excitatory and inhibitory neuron configuration for E1-E2 mode, according to an embodiment of the invention.

TABLE 4

| Excitatory and inhibitory neuron for E1-E2 | |
|---|---|
| Number of excitatory neurons in E1-E2 | X (any number, X + H < N) |
| Number of inhibitory neurons in E1-E2 | H (any number, X + H < N) |
| Excitatory neuron (Ne) and inhibitory neuron (Ni) behavior | Both Ne and Ni use same hardware infrastructure, but, the parameters can be set/reconfigured to provide different behaviors (for Ne add to, for Ni subtract from, the neuron potential when a spike arrives). |
| Input and output neurons of inhibitory neuron for E1-E2 | Axon of each Ni will have 'X' ON synapses and dendrite of each Ni will have 'X/2' ON synapses connecting to the E2 neurons. The synapses are not plastic. This connectivity is initialized at the beginning of the chip operation.<br>(In general, however, Ni may have the exact same behaviors as Ne, including having plastic synapses.) |

TABLE 4-continued

Excitatory and inhibitory neuron for E1-E2

| | |
|---|---|
| Output of inhibitory neuron? | Ni output is locally fed into the synapse crossbar. When a Ni fires/spikes, a global flag is set, to indicate that the current incoming signal at the input ports of receiving neurons has to be subtracted. |

If a specified learning rule (i.e., E1-E2) uses only less than N neurons, the remaining neurons that are not participating in E1-E2 are inactive. For the inactive neurons, the synapses on dendrites and axons of inactive neurons are initialized to 0, external input for inactive neurons in every cycle is 0, and learning is disabled using a configuration bit.

Figure 11:
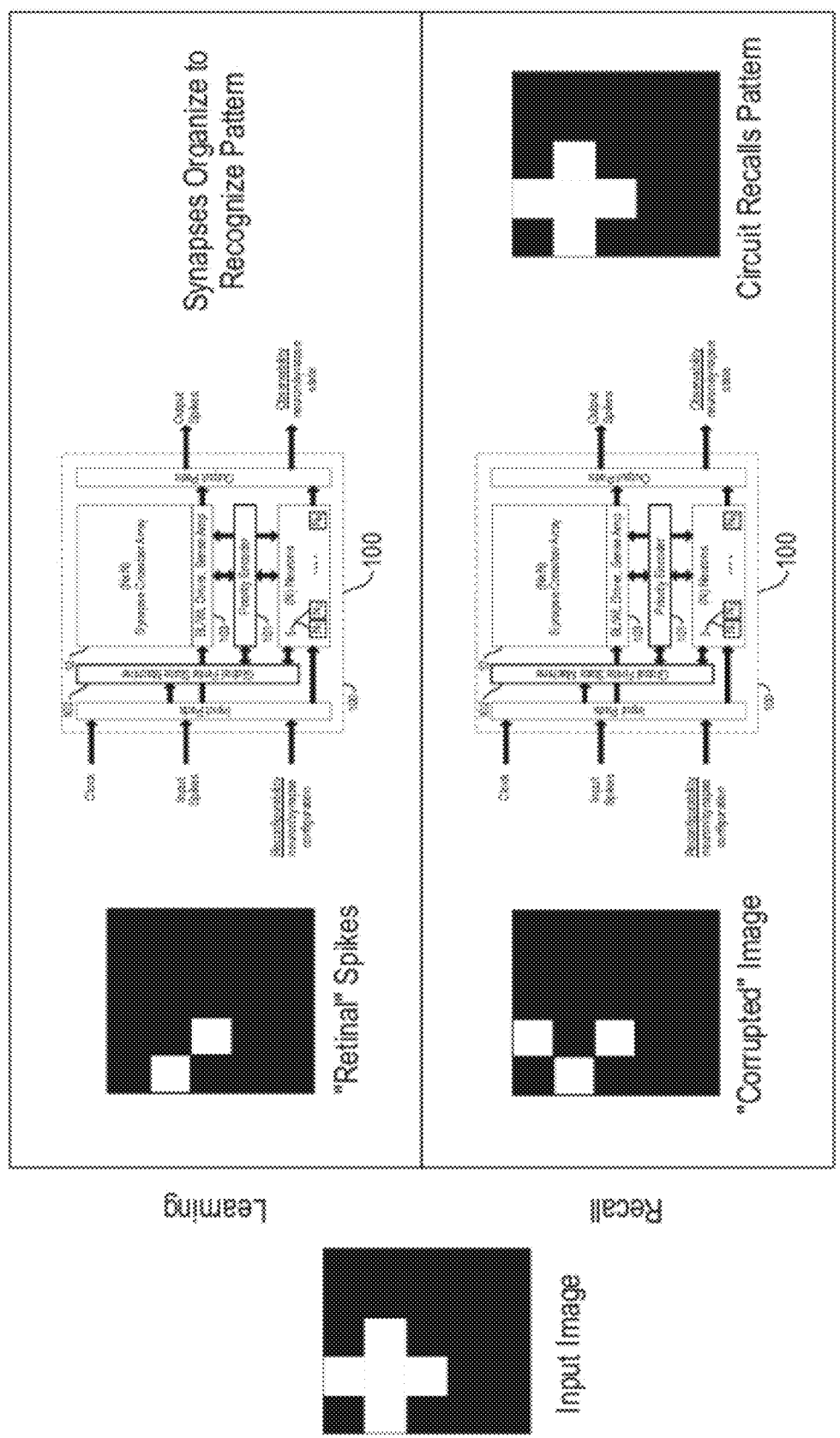
FIG. 11 shows an example application of a neural network for pattern recognition, in accordance with an embodiment of the invention.

FIG. 11 shows an example application of the chip 100 based on the architecture 160 for pattern recognition in an input image, according to an embodiment of the invention. The chip 100 performs non-linear pattern classification, by interacting with the external environment in the forms of digital spike inputs and outputs. The neurons 5 in the circuit 100 simulate retinal neurons and during learning phase based on the input pattern the neurons 5 spike and synapses 31 learn the input image pixel pattern. Not all the pixels that are lighted have to come in at the same time. The input image comes in as frames, and the circuit 100 integrates the frames together as one object. Then, in a recall phase, when a corrupted frame is provided to the circuit 100, the full pattern is recalled (i.e., pattern recognition). Any data input stream, can be learned, classified, and recalled. As such, in a learning phase, the architecture 160 learns correlations in spatio-temperal patterns and classification of said patterns. Once the learning is completed, the circuit can predict and complete incomplete patterns in a recall phase.

The digital circuit 100 also provides fine-grain verification between hardware and software for every spike, neuron state, and synapse state. For the E1-E2 configuration, comparing the spike outputs and neuron/synapse states of hardware and software simulation, a one-to-one equivalence is achieved for the full-length simulation of 15,000 (biological) timesteps. The circuit 100 can be mounted on a stand-alone card interacting with the external environment such as a computer or other computing platform (e.g., a mobile electronic device).

In another embodiment, the present invention provides a neuronal circuit comprising multi-bit transposable crossbar array of SRAM synapses for interconnecting digital neurons. The circuit provides general-purpose hardware that enhances the pattern classification capability of a spiking neural network by interacting with the external environment in the forms of digital spike inputs and outputs. In one implementation, the circuit comprises a low-power digital CMOS spiking neural network that is reconfigurable, to implement stochastic STDP on multi-bit synapse array for interconnecting digital neurons, with improved learning capability.

In one embodiment, multi-bit (m-bit) synapses are implemented using transposable SRAM cells which can store a value from 0 to 2m−1, representing a fine-grain connection between every neuron connection in a multi-bit synapse array. In one implementation, the values in the range 0 to 2m−1 represents the level of conductivity of a synapse. A priority encoder sequentially allows array access to all simultaneously spiking neurons to implement communication of synaptic weights and programming of synapses. A global finite state machine module controls the entire operation of the chip including the multi-bit synapse array. Driver modules receive digital inputs from neurons and program the multi-bit synapse array.

Each digital neuron comprises a learning module including two counters that decay at every pre-specified number of timesteps and are reset to a pre-defined value when a neuron spiking event occurs. In a synapse update phase, the learning module reads the existing multi-bit synapse value from the synapse array, adds or subtracts the decay counter value to the value read from the array, and updates the modified new multi-bit value to the synapse array.

Timing operations in the update phase with multi-bit synapse array are such that multiple read and write operations can occur in the synapse update phase in a timestep. To reduce read/write latency to the synapse array from each neuron, the read and write operations are interleaved such that every hardware cycle is performing either a synapse read or write, increasing the overall throughput.

Figure 12:
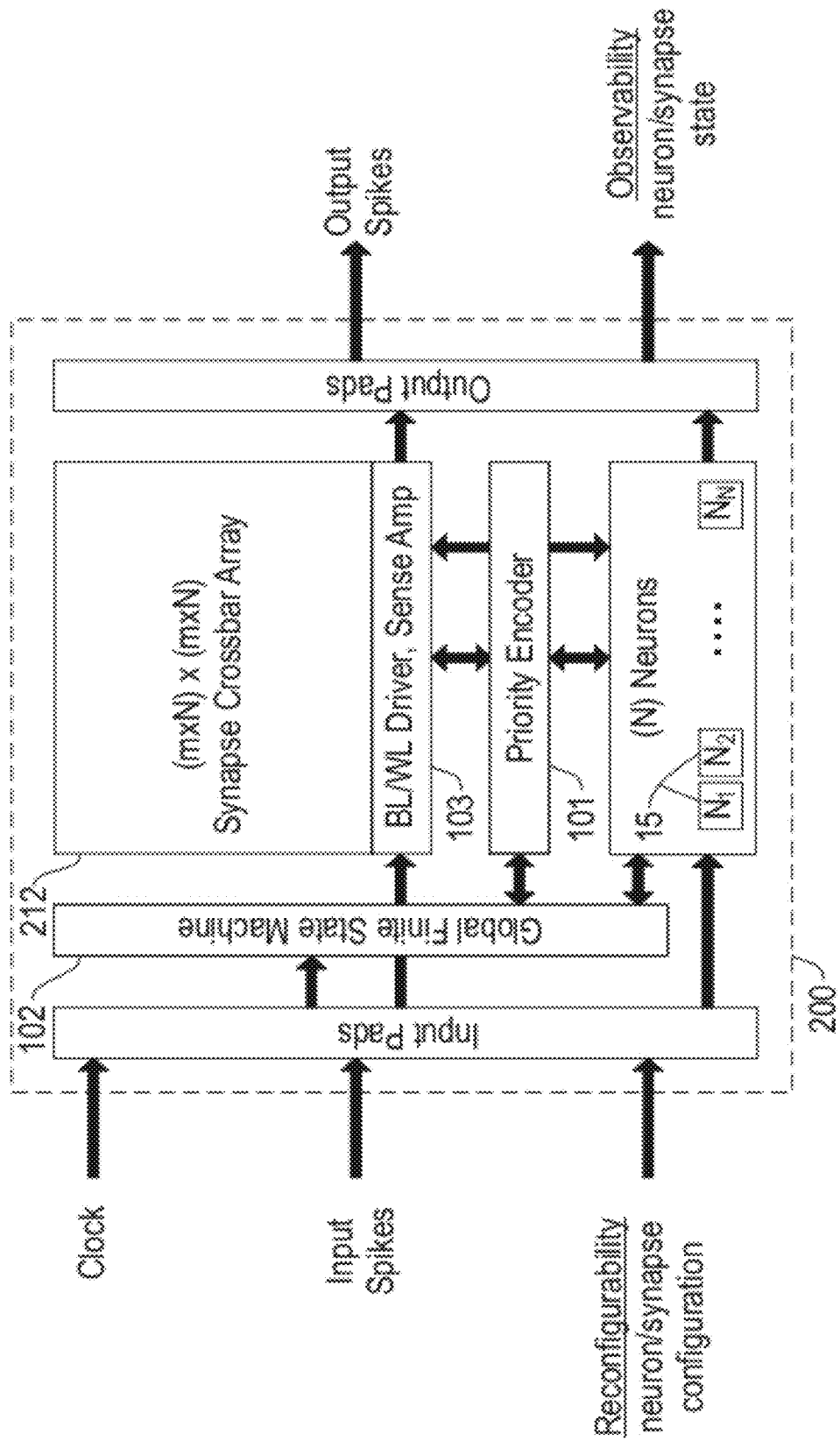
FIG. 12 shows a diagram of a neuromorphic and synaptronic circuit comprising a crossbar array of multi-bit electronic synapses for interconnecting digital electronic neurons, in accordance with an embodiment of the invention.

FIG. 12 shows a block diagram of a reconfigurable neural network circuit 200 implemented as a circuit chip including a multi-bit transposable crossbar array of SRAM synapses interconnecting digital neurons, according to an embodiment of the invention. The circuit 200 includes a crossbar array 212 of multi-bit synapses 131 (FIG. 14) interconnecting multiple digital neurons 15 (i.e., $N_1, \ldots, N_N$). The digital neurons 15 associated with multi-bit SRAM array 212 provide learning capability in a spiking neural network. Multi-bit synapses provide noise tolerance. Every neuron operation and parameter (spiking, integration, learning, external communication) intended for multi-bit synapses is reconfigurable, customizable, and observable. The circuit 200 achieves improvement in learning time, which enables more complicated pattern recognition.

The multi-bit synapse array 212 stores the strength of connection between each neuron 15 in a fine-grain value between 0 and $2^m-1$. Digital neurons 15 receive multi-bit spike inputs and integrate them, such that in each neuron when the integrated input exceeds a threshold, the neuron spikes. In one example, within a timestep, neuron and synapse operations in the circuit 200 go through the following sequence of synapse updating (programming):

Phase 1: Determine which neurons 15 spiked in the previous timestep, and reset the potential of those neurons.

Phase 2: Implement neuron spiking by pulsing a row (or axon) of the crossbar array 212. Read value of each synapse 131 and pass it to a connected neuron 15. Obtain external input for each neuron.

Phase 3: Each neuron 15 checks its dendrites for synapses 131 in their "pulsed" state and reads their multi-bit values. Integrate the multi-bit synapse (excitatory/inhibitory) input, as external input to the neuron potential.

Phase 4: Read the existing multi-bit synapse value from the SRAM array 212. Modify the synapse value by adding or subtracting the tau counter value, depending on the learning rule/mode. Write the new multi-bit synapse value into the SRAM array 212.

Phase 5: Determine which neurons will spike the next time step by comparing each neuron potential against the customized threshold.

Figure 13:
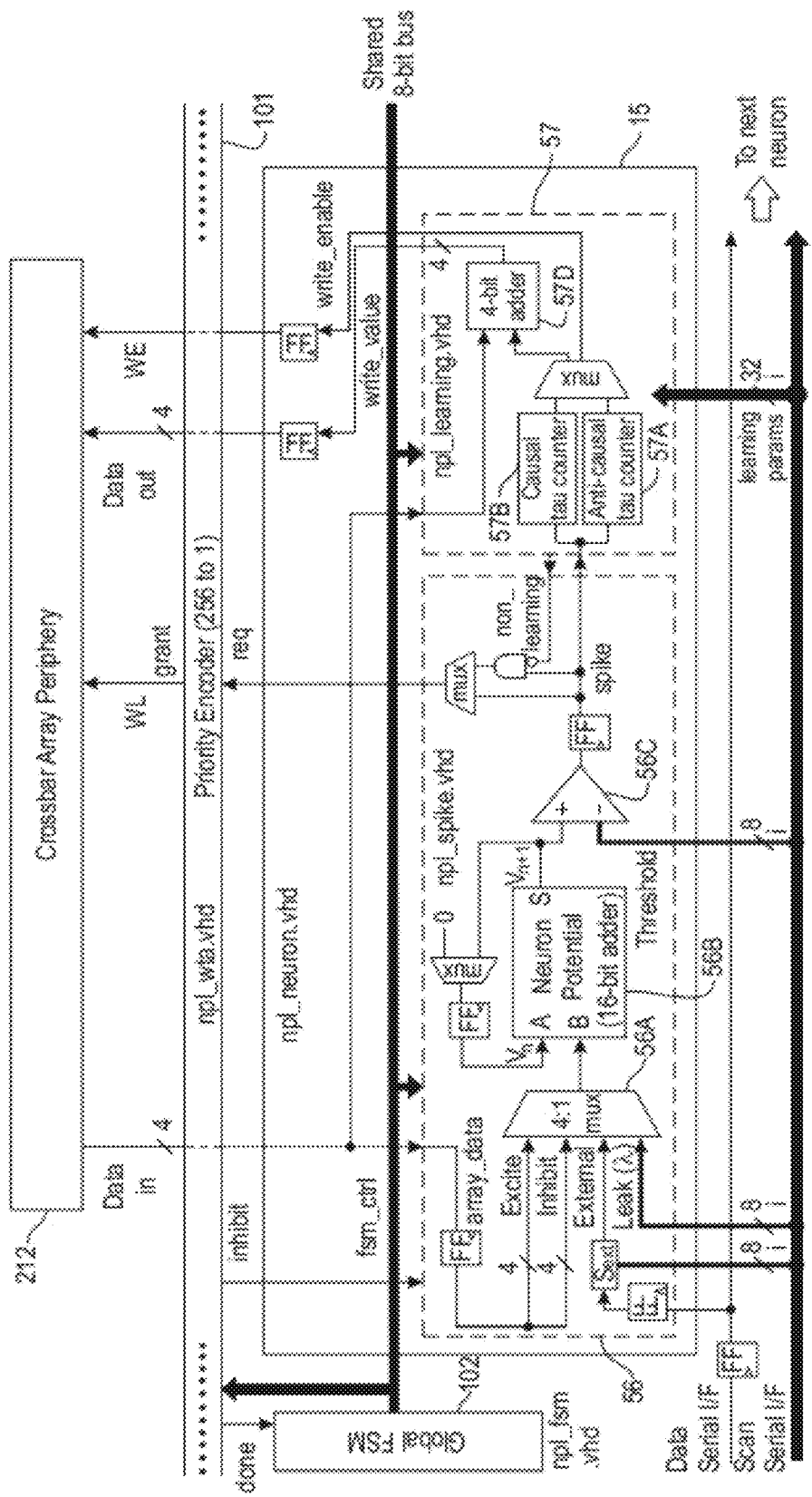
FIG. 13 shows a diagram of a digital electronic neuron in the circuit of FIG. 12, in accordance with an embodiment of the invention.

FIG. 13 shows details of an example implementation of a digital neuron 15 in the circuit 200, according to an embodiment of the invention. Multi-bit input and output channels exist between each neuron 15 and the multi-bit synapse array 212. The neuron 15 comprises an integration and spike module 56 and a learning module 57. A multi-bit value is passed on from the synapse array 212 to the neuron 15 for integration in the spike (read) phase. In the integration and spike module 56, a multiplexer circuit 56A is used to select all the inputs arriving at the neuron 15 to integrate to a value held at an adder circuit 56B. The value in the adder circuit 56B represents the potential of the neuron 15 (e.g., voltage potential V based on accumulated input spikes). A comparator circuit 56C is used to check if the current value in the adder 56B is above a threshold value. The output of the comparator 56C is used to signal neuron spiking. This spike signal is then sent to the priority encoder 101 which then grants the neuron 15 access to the crossbar array 212 in a sequential manner.

The learning module 57 includes digital counters 57A and 57B, which decay at a pre-specified rate each time step and are reset to a pre-defined value when the neuron 15 spikes. In the update (write) phase, the learning module goes through the process of read-modify-write including: reading the existing multi-bit synapse value from the synapse array 212, adding or subtracting the decay counter value to the value read from the array 212, and updating the modified new multi-bit value to the synapse array 212. As such, the synaptic strength (multi-bit synapse value) of 131 synapses between neurons 15 are strengthened or weakened every time-step according to the time elapsed since a neuron spiked. The adder 57D adds (or subtracts) the τ counter value to (or from) the current synapse value. Compared to neuron 5 in FIG. 3, the neuron 15 does not utilize weighting factors to the input of the multiplexer 56, and does not utilize a probability generator.

Figure 14:
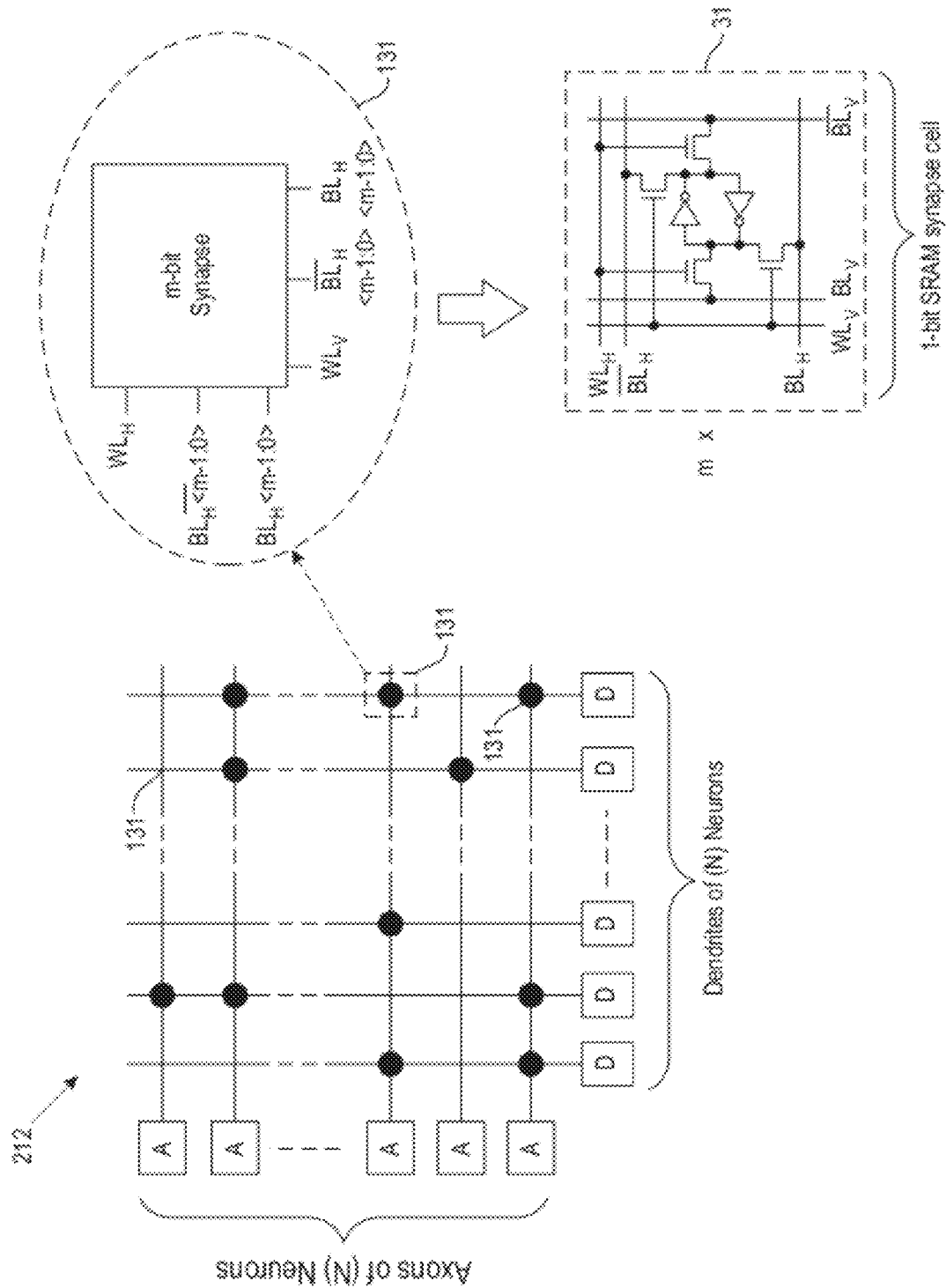
FIG. 14 shows a diagram of a crossbar array of electronic synapses and details of a multi-bit electronic synapse at a cross-point junction of the crossbar array in the circuit of FIG. 12, in accordance with an embodiment of the invention.

FIG. 14 shows an example implementation of the synapse crossbar array 212 of FIG. 12, according to an embodiment of the invention. The synapses 131 are multi-bit memory devices. In one embodiment, a synapse 131 comprises m transposable SRAM cells (e.g., transposable 8-T SRAM cell). The synapses 131 are updated as described further above. Multiple (m) transposable SRAM cells 31 are used in each multi-bit synapse 131 for pre-synaptic (row) and post-synaptic (column) update in the array 212. On each horizontal (row) and vertical (column) direction, a single-bit cell 31 uses a pair of bit lines, such that an multi-bit synapse has m pairs of bit lines, and the entire multi-bit synapse values are written at once (i.e., using only one word line). The crossbar array 212 can comprise a N×N transposable SRAM synapse array of multi-bit synapse cells 131 implementing a fully connected crossbar for N digital neurons 15.

Figure 15:
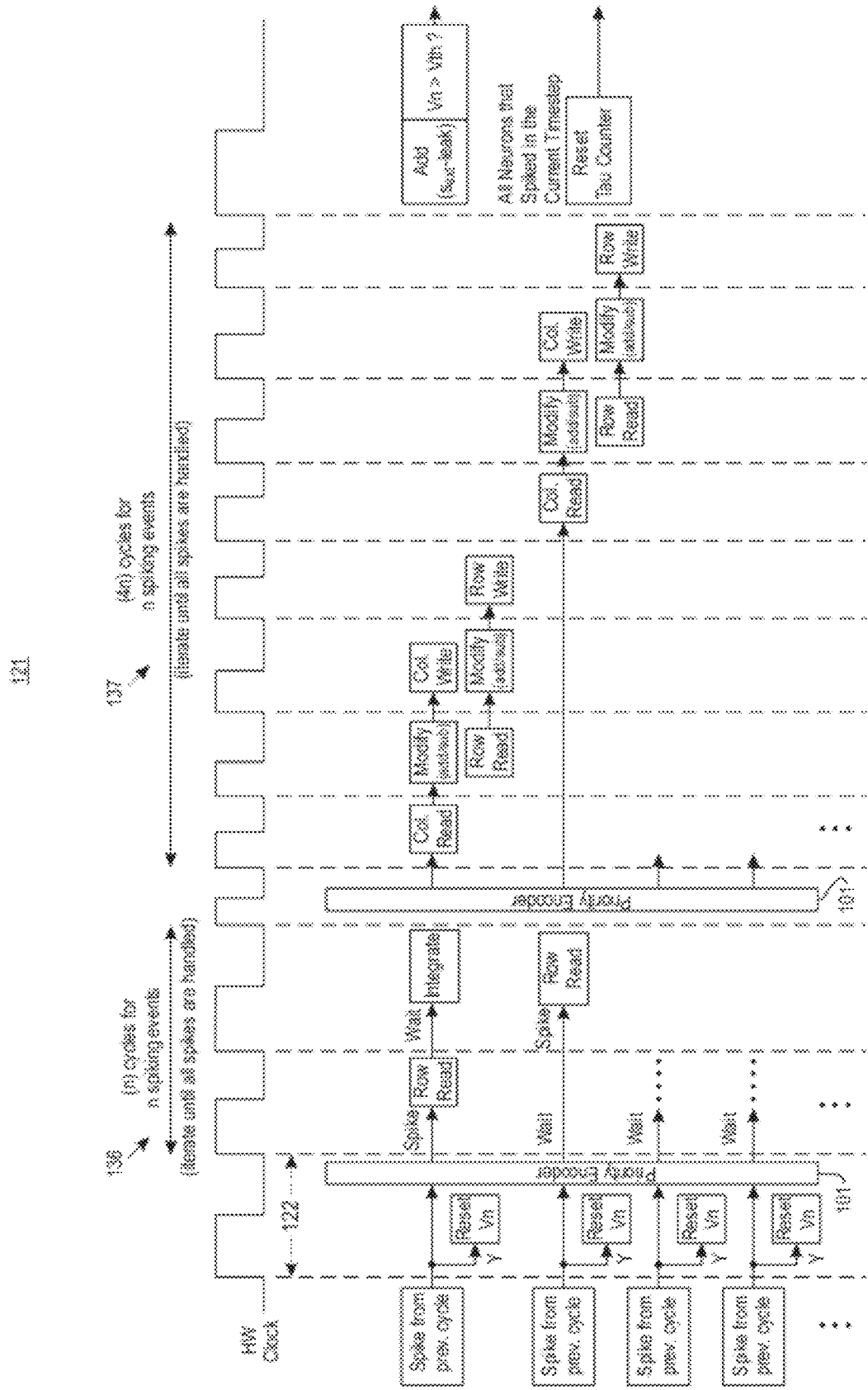
FIG. 15 shows a system timing diagram for neuron and synapse operations in the circuit of FIG. 12, in accordance with an embodiment of the invention.

FIG. 15 shows an example system timing diagram 121 for neuron operation for the circuit 200 in conjunction with FIGS. 12-14, according to an embodiment of the global finite state machine 102. As illustrated in FIG. 15, sequential operation of neurons 15 is performed within a timestep, utilizing phases/cycles 122 of a digital clock (HW clock), which is governed by the global finite state machine 102. In an update phase, a read-modify-write process is performed, and the synapse read/write operations are interleaved to maximize throughput. All spiking neurons 15 first complete their communication in n cycles 136, and the updates for the synapses 131 on the axons and dendrites are completed in 4n cycles 137 for the crossbar array 212.

In one embodiment, the circuit 200 can operate in fixed time step and variable time step modes, similar to that described for circuit 100 further above in relation to FIG. 6. In one embodiment, the circuit 200 can operate in pipeline fashion, similar to that described for circuit 100 further above in relation to FIG. 7.

Figure 16:
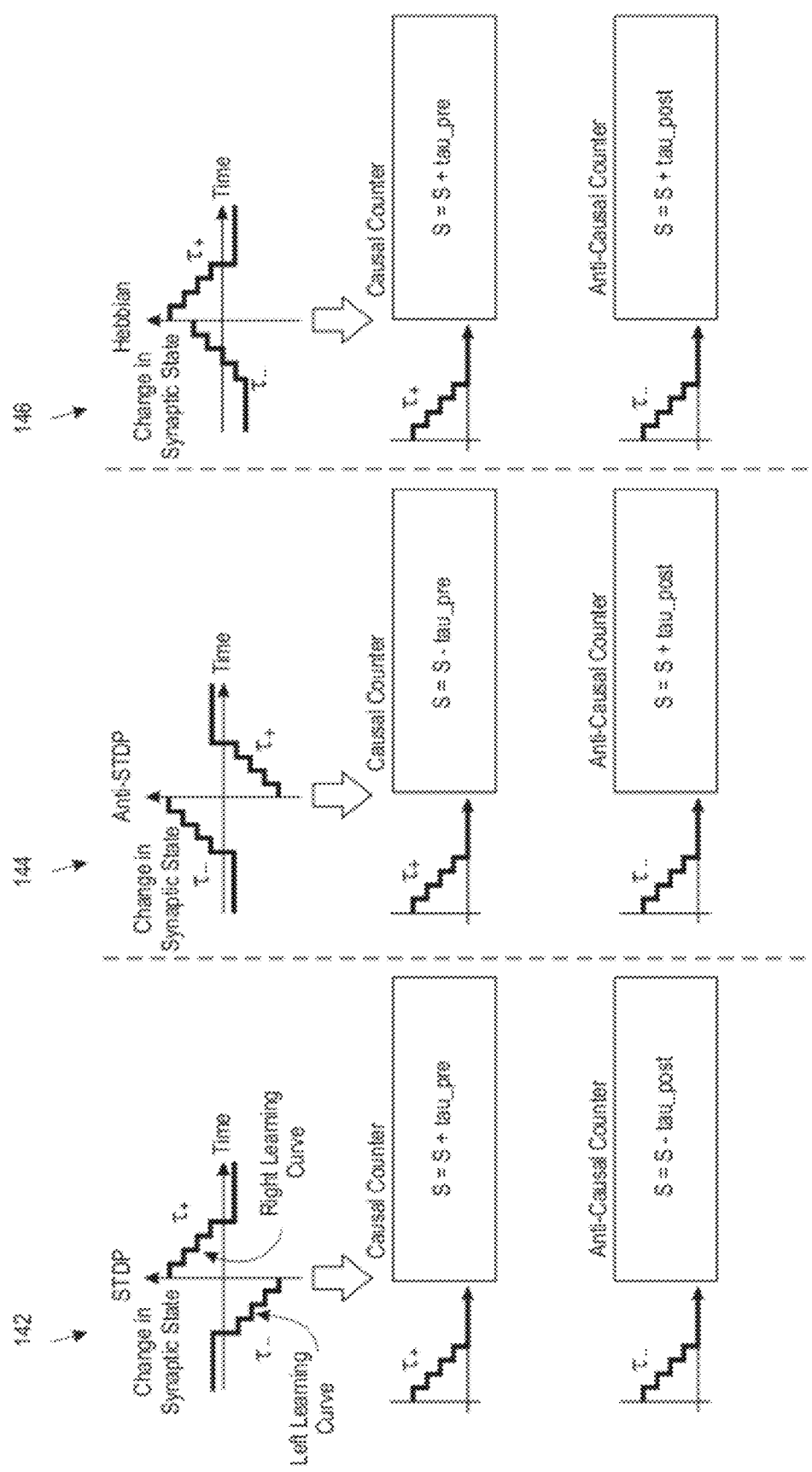
FIG. 16 shows learning mode processes based on learning rules for synapse updates in the circuit of FIG. 12, in accordance with an embodiment of the invention.

In the circuit 200, learning rules for synapses are based entirely on causality (no probabilistic synapse updated). FIG. 16 shows learning mode processes 142, 144, 146 for learning rules STDP, Anti-STDP (A-STDP) and Hebbian, respectively, in the circuit 200 for 4-bit synapses 131 without constant, according to an embodiment of the invention. The value of S is bounded between 0 and $2^m-1$. The learning mode processes are performed in conjunction with neuron circuit 15 in FIG. 12. The τ (tau) counter value of a digital neuron 15 decreases as time elapses since the last spike. For a multi-bit synapse update, when τ reaches 0, a constant (const) may be involved in the learning process. When a constant is not involved in the learning process, the synapse update is performed as shown in FIG. 16.

Figure 17:
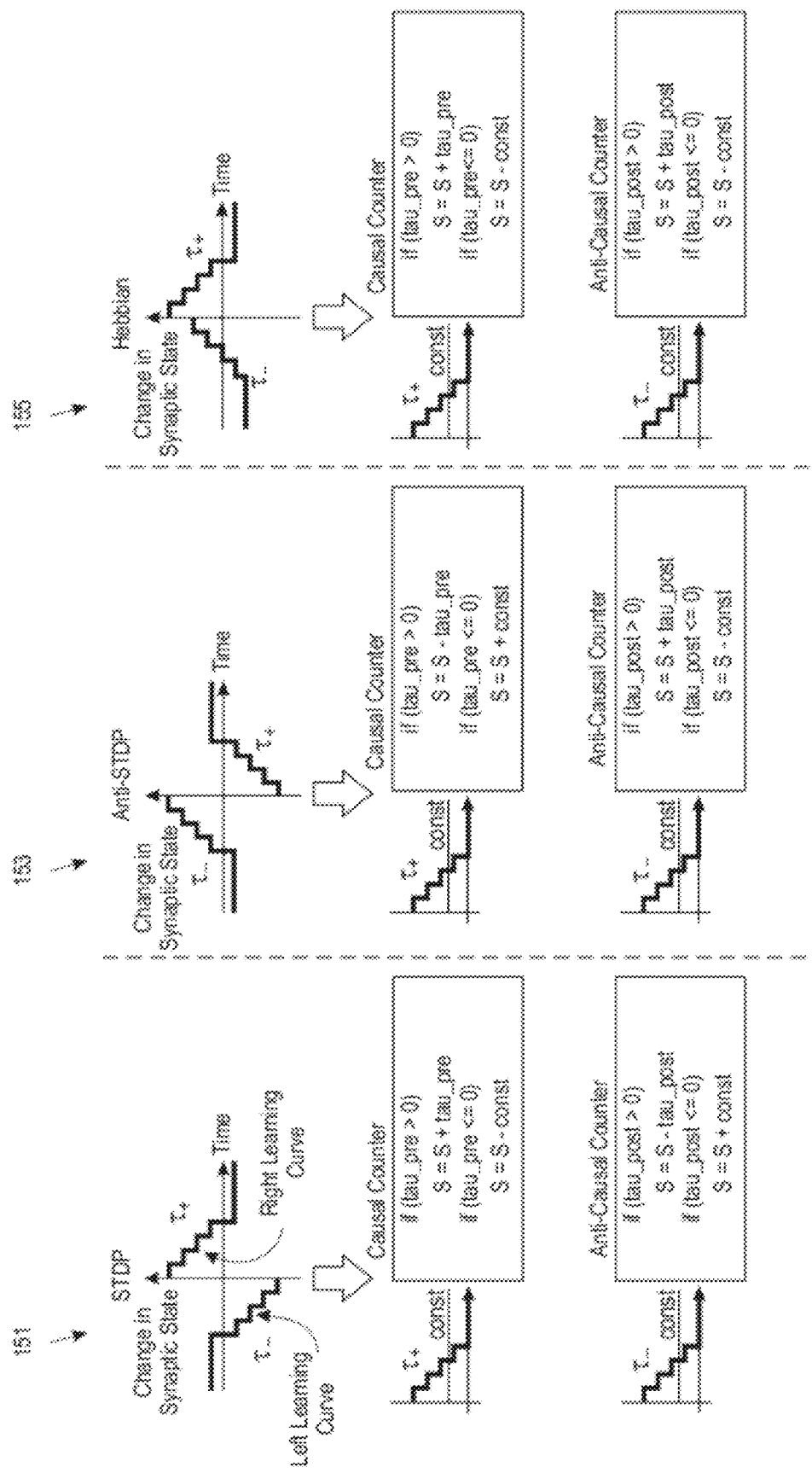
FIG. 17 shows further learning mode processes based on learning rules for synapse updates in the circuit of FIG. 12, in accordance with an embodiment of the invention.

Referring to FIG. 17, when a constant is involved in the learning process, the constant is added to (or subtracted from) the current multi-bit synapse value once τ reaches 0. FIG. 17 shows learning mode processes 151, 153, 155 for learning rules STDP, Anti-STDP (A-STDP) and Hebbian, respectively, in the circuit 200 with constant, according to an embodiment of the invention. The learning mode processes are performed in conjunction with neuron circuit 15 in FIG. 12 for synapse updates. Left and right learning curves of each mode can independently select whether a constant is used or not. The value of S is bounded between 0 and $2^m-1$.

Table 5 below shows an example neuron configuration for control and observability in conjunction with the circuits in FIGS. 12 and 13, according to an embodiment of the invention. All scan configurations (for control and observability) could be customized as needed. In Table 5 "b" means bits.

TABLE 5

Neuron reconfiguration/observability

| Reconfiguration Control (Scan In) | | Observability (Scan Out) | |
|---|---|---|---|
| 8 b: | Leak parameter (λ) | 1 b: | Excite/Inhibit input (SA out) |
| 8 b: | External input weight ($s_{ext}$) | 16 b: | Neuron potential (Vn) |
| 8 b: | Threshold | 1 b: | Spike signal (θ compare out) |
| 1 b: | Learning enable | 4 b*2: | Tau counter output |
| 18 b: | Learning parameters—4 b*2, 3 b*2, 4 b | 6 b*2: | Slope counter output |
| 4 b: | Represent 16 learning modes | 1 b: | STDP comparator output |
| Total: 47 b | | Total: 39 b | |

Figure 18:
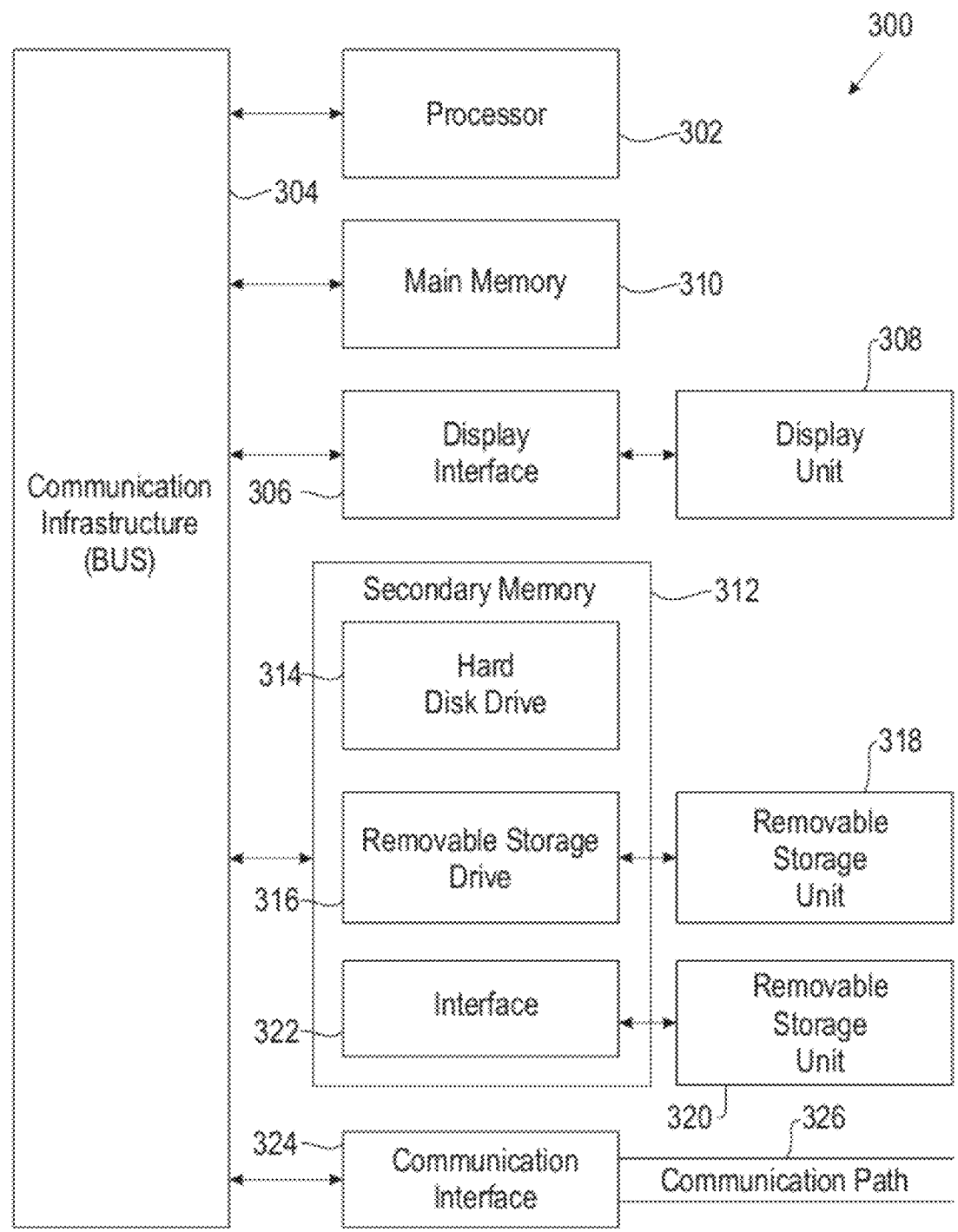
FIG. 18 shows a high level block diagram of an information processing system useful for implementing one embodiment of the present invention.

FIG. 18 is a high level block diagram showing an information processing circuit 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A reconfigurable neural network circuit, comprising:
an electronic synapse array comprising multiple digital synapses interconnecting a plurality of digital electronic neurons, wherein each neuron comprises an integrator that integrates input spikes and generates a spike signal when the integrated input spikes exceed a threshold;
a first learning module and a second learning module for reconfiguring a pre-synaptic neuron and a post-synaptic neuron, respectively, in the synapse array, wherein each learning module is independently reconfigurable; and
a control module for reconfiguring the synapse array, the control module comprising a global finite state machine that controls timing for operation of the circuit, and a priority encoder that allows spiking neurons among said neurons, to sequentially access the synapse array.

2. The network circuit of claim 1, wherein the circuit provides one of spike-timing dependent plasticity (STDP), anti-STDP, Hebbian and anti-Hebbian learning rules on the synapse array.

3. The network circuit of claim 2, wherein the synapse array comprises a random access memory synapse array, each neuron comprises a reconfigurable digital complementary metal-oxide-semiconductor (CMOS) device and the circuit provides binary stochastic spike timing dependent plasticity using the random access memory synapse array.

4. The network circuit of claim 1, further comprising:
driver modules that receive digital inputs from said neurons and program the synapse array based on the digital inputs and learning rules; and
sense amplifiers that measure the state of each synapse and convert it to binary data.

5. The network circuit of claim 4, wherein:
each neuron comprises a learning module including digital counters that decay at a pre-specified rate during each timestep, and are reset to a pre-defined value when a neuron spiking event occurs.

6. The network circuit of claim 5, wherein:
the priority encoder allows spiking neurons among said neurons to sequentially access the synapse array, providing communication of synaptic weights and programming of said synapses.

7. The network circuit of claim 6, wherein:
each synapse interconnects an axon of a pre-synaptic neuron with a dendrite of a post-synaptic neuron;
each learning module is reconfigurable independent of the other; and
neuron parameters including spiking, integration, learning and communication for each neuron are reconfigurable using reconfiguration input controls.

8. The network circuit of claim 7, wherein:
during a timestep, multiple neuron spikes are sequentially handled in a read phase and synapse updates are sequentially handled in a write phase, utilizing cycles generated by a digital clock, wherein a timestep is divided into multiple digital clock cycles.

9. The network circuit or claim 8, wherein:
the start of a subsequent timestep is triggered using handshaking signals when neuron and synapse operations of a previous timestep are completed.

10. The network circuit of claim 9, wherein:
input operations, neuron and synapse operations, and output operations are pipelined.

11. The network circuit of claim 7, wherein the learning module further comprises a linear feedback shift registers for probabilistically updating said synapses according to learning rules based on a decay rate of said one or more digital counters.

12. The network circuit of claim 11, wherein:
each synapse comprises a binary synapse including a transposable 1-bit static random access memory cell; and
the linear feedback shift register generates a new random number during every phase for a programming synapse.

13. The network circuit of claim 12, wherein:
the learning module further comprises a comparator that compares the random number with a spike counter, to generate a digital signal for programming a connected synapse by a probabilistic update according to a learning rule specified in a decay rate of the counter.

14. The network circuit of claim 7, wherein in a learning phase, the circuit learns correlations in spatio-temperal patterns and classification of said patterns in the synapse array, and in a recall phase the reconfigurable neural network circuit predicts and completes incomplete patterns.

15. The network circuit of claim 7, wherein the circuit is reconfigurable for learning rules including spike-timing dependent plasticity (STDP), anti-STDP, Hebbian and anti-Hebbian.

16. A reconfigurable neural network circuit, comprising:
an electronic synapse array comprising multiple digital synapses interconnecting a plurality of digital electronic neurons, wherein each neuron comprises an integrator that integrates input spikes and generates a spike signal when the integrated input spikes exceed a threshold; and
a control module for reconfiguring the synapse array, the control module comprising a global finite state machine that controls timing for operation of the circuit, and a priority encoder that allows spiking neurons among said neurons, to sequentially access the synapse array;
wherein each synapse comprises a multi-bit synapse including multiple transposable 1-bit static random access memory cells.

17. The network circuit of claim 16, wherein each neuron comprises a reconfigurable digital complementary metal-oxide-semiconductor (CMOS) circuit device and the circuit provides multi-bit deterministic spike timing dependent plasticity using the synapse array.

18. The network circuit of claim 16, further comprising:
driver modules that receive digital inputs from said neurons and program the synapse array based on the digital inputs and learning rules; and
sense amplifiers that measure the state of each synapse and convert it to data.

19. The network circuit of claim 18, wherein:
each neuron comprises a learning module including digital counters that decay at a pre-specified rate during each timestep, and are reset to a pre-defined value when a neuron spiking event occurs.

20. The network circuit of claim 19, wherein:
the priority encoder allows spiking neurons among said neurons to sequentially access the synapse array, providing communication of synaptic weights and programming the synapses.

21. The network circuit of claim 20, wherein:
each synapse interconnects an axon of a pre-synaptic neuron with a dendrite of a post-synaptic neuron, the circuit further comprising a first learning module for an axonal, pre-synaptic neuron, and a second learning module for a dendritic, post-synaptic neuron, such that each learning module is reconfigurable independent of the other; and
neuron parameters including spiking, integration, learning and communication for each neuron are reconfigurable using reconfiguration input controls.

22. The network circuit of claim 21, wherein:
during a timestep, multiple neuron spikes are sequentially handled in a read phase and synapse updates are sequentially handled in a write phase, utilizing cycles generated by a digital clock, wherein a timestep is divided into multiple digital clock cycles.

23. The network circuit of claim 19, wherein each synapse comprises m transposable static random access memory cells that store a multi-bit value, representing a fine grain connection between every neuron connection.

24. The network circuit of claim 23, wherein:
in an update phase, the neuron reads an existing multi-bit synapse value from the synapse array, adds or subtracts the decay counter value to the value read from the synapse to generate a new multi-bit value, and updates the synapse with the new multi-bit value, such that the synapse update operation is performed in the update phase when a neuron spikes.

25. The network circuit of claim 24, wherein multiple read and write operations are performed in an update phase within a timestep, and the read and write operation are interleaved such that in every hardware cycle the circuit performs either a synapse read or write.

26. The network circuit of claim 21, wherein in a learning phase, the circuit learns correlations in spatio-temperal patterns and classification of said patterns in the synapse array, and in a recall phase the reconfigurable neural network circuit predicts and completes incomplete patterns.

27. The network circuit of claim 21, wherein the circuit is reconfigurable for learning rules including spike-timing dependent plasticity (STDP), anti-STDP, Hebbian and anti-Hebbian.

* * * * *